US012615433B2

(12) United States Patent
Lee et al.

(10) Patent No.: US 12,615,433 B2
(45) Date of Patent: Apr. 28, 2026

(54) SYSTEM AND METHOD FOR USER INTERFACE GUIDANCE SYSTEM FOR ELECTRONIC DEVICES

(71) Applicant: Walmart Apollo, LLC, Bentonville, AR (US)

(72) Inventors: Chi Shing Lee, Oakland, CA (US); Jason Hall, Kaneohe, HI (US); Eugene Krivopaltsev, San Jose, CA (US); Sumit Jain, Bengaluru (IN); Dheeraj Kumar, Bengaluru (IN); Bhavya Tiruvaipati, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 28 days.

(21) Appl. No.: 18/371,999

(22) Filed: Sep. 22, 2023

(65) Prior Publication Data

US 2025/0106501 A1     Mar. 27, 2025

(51) Int. Cl.
| | |
|---|---|
| *H04N 23/60* | (2023.01) |
| *G06T 7/11* | (2017.01) |
(Continued)

(52) U.S. Cl.
CPC .............. *H04N 23/64* (2023.01); *G06T 7/11* (2017.01); *G06T 7/73* (2017.01); *G06V 40/165* (2022.01);
(Continued)

(58) Field of Classification Search
CPC ...... H04N 23/64; H04N 23/80; H04N 23/667; G06T 7/11; G06T 7/73;
(Continued)

(56) References Cited

U.S. PATENT DOCUMENTS

| | | | |
|---|---|---|---|
| 6,686,970 B1 * | 2/2004 | Windle | H04N 1/00183 |
| | | | 348/584 |
| 8,559,766 B2 * | 10/2013 | Tilt | G06T 1/0007 |
| | | | 382/254 |

(Continued)

FOREIGN PATENT DOCUMENTS

KR          102365750 B1      2/2022

OTHER PUBLICATIONS

Kanase, R., et al., "Pose Estimation and Correcting Exercise Posture," ITM Web of Conferences 40, 03031, https://doi.org/10.1051/itmconf/20214003031 2022.

(Continued)

*Primary Examiner* — Timothy R Newlin

(74) *Attorney, Agent, or Firm* — DICKINSON WRIGHT RLLP; Hector A. Agdeppa

(57)          ABSTRACT

A method can include determining a frame processing operation for one or more frames of an image from an electronic device, the one or more frames of the image corresponding to a body of a user; determining if the electronic device is in alignment; determining if the electronic device is in an environment that satisfies a light threshold; determining pre-selected joint points for the body of the user in the one or more frames of the image based on pre-selected joint landmarks defined in a configuration set; determining a face alignment of the user in the one or more frames of the image; determining hair of the user is properly positioned in the one or more frames of the image; determining enough skin of the user is visible in the one or more frames of the image; and in response to the one or more frames of the image being validated, capturing an image of the user with the pre-selected joint landmarks to enable items to be overlaid on the image of the user. Other embodiments are disclosed.

19 Claims, 13 Drawing Sheets

(51) Int. Cl.

| | |
|---|---|
| *G06T 7/73* | (2017.01) |
| *G06V 40/16* | (2022.01) |
| *H04N 23/80* | (2023.01) |
| *H04N 23/667* | (2023.01) |

(52) U.S. Cl.
CPC ... *H04N 23/80* (2023.01); *G06T 2207/10024* (2013.01); *G06T 2207/20081* (2013.01); *G06T 2207/30201* (2013.01); *H04N 23/667* (2023.01)

(58) Field of Classification Search
CPC . G06T 2207/10024; G06T 2207/20081; G06T 2207/30201; G06V 40/165
See application file for complete search history.

(56) References Cited

U.S. PATENT DOCUMENTS

| | | | |
|---|---|---|---|
| 10,096,122 B1 * | 10/2018 | Agrawal | G06T 7/90 |
| 2005/0129311 A1 * | 6/2005 | Haynes | G06V 10/772 382/224 |
| 2006/0177131 A1 * | 8/2006 | Porikli | G06F 17/18 382/168 |
| 2007/0217690 A1 * | 9/2007 | Dempski | G06V 40/162 382/165 |
| 2010/0177981 A1 * | 7/2010 | Wang | G06T 7/11 382/260 |
| 2011/0096183 A1 * | 4/2011 | Robertson | H04N 5/275 348/222.1 |
| 2011/0228044 A1 * | 9/2011 | Miyamoto | H04N 23/635 348/E5.031 |
| 2013/0044194 A1 * | 2/2013 | Tilt | H04N 1/2141 348/61 |
| 2014/0176565 A1 * | 6/2014 | Adeyoola | G06F 18/22 345/473 |
| 2016/0014392 A1 * | 1/2016 | Liang | G06T 7/11 348/47 |
| 2016/0140719 A1 * | 5/2016 | Lucey | G01B 11/02 382/154 |
| 2016/0154993 A1 * | 6/2016 | Aarabi | G06T 7/90 382/118 |
| 2016/0287067 A1 * | 10/2016 | Fan | A61B 3/14 |
| 2016/0373647 A1 | 12/2016 | Garcia Morate et al. | |
| 2017/0270686 A1 * | 9/2017 | Couch | G06Q 30/0643 |
| 2017/0372515 A1 * | 12/2017 | Hauswiesner | G06T 7/12 |
| 2018/0137663 A1 * | 5/2018 | Rodriguez | G06V 40/165 |
| 2018/0240280 A1 * | 8/2018 | Chen | G06T 19/20 |
| 2019/0050427 A1 * | 2/2019 | Wiesel | G06T 19/00 |
| 2019/0205965 A1 * | 7/2019 | Li | G06Q 30/0643 |
| 2019/0208115 A1 * | 7/2019 | Paul | G06V 40/161 |
| 2019/0371080 A1 * | 12/2019 | Sminchisescu | G06T 17/20 |
| 2020/0020122 A1 * | 1/2020 | Chae | G06T 7/60 |
| 2020/0177800 A1 * | 6/2020 | Berlusconi | G06T 17/00 |
| 2020/0349628 A1 * | 11/2020 | Sazan | G06T 7/13 |
| 2021/0065418 A1 * | 3/2021 | Han | G06T 11/60 |
| 2021/0287274 A1 * | 9/2021 | Nguyen | G06N 3/04 |
| 2021/0386219 A1 * | 12/2021 | Koci | G06T 1/0007 |
| 2022/0198727 A1 * | 6/2022 | Khadem | G06T 11/60 |
| 2022/0237841 A1 * | 7/2022 | Spencer | G06T 13/40 |
| 2022/0375258 A1 * | 11/2022 | Hua | G06V 40/171 |
| 2022/0398773 A1 * | 12/2022 | Fischer | G06V 20/20 |
| 2022/0398781 A1 * | 12/2022 | Saban | G06V 40/171 |
| 2023/0051436 A1 * | 2/2023 | Ahmad | G16H 50/20 |
| 2023/0086880 A1 * | 3/2023 | Li | G06T 7/10 345/646 |
| 2023/0206477 A1 * | 6/2023 | Akahori | G06T 7/33 382/128 |
| 2023/0260166 A1 * | 8/2023 | Bojan | G06V 10/225 382/103 |
| 2024/0296579 A1 * | 9/2024 | Zhu | G06T 7/75 |
| 2024/0404138 A1 * | 12/2024 | Zhang | G06T 7/11 |

OTHER PUBLICATIONS

Nguyen-Trang, T., "A New Efficient Approach to Detect Skin in Color Image Using Bayesian Classifier and Connected Component Algorithm," Hindawi, Mathematical Problems in Engineerring, VOlum 2018, Article ID 5754604, 10 pgs, https://doi.org/10.1155/2018/5754604 2018.

Fang, N., Xie, H., and Igarashi, T., "Selfie Guidance System in Good Head Postures," SymCollab '18, Tokyo, Japan, https://ceur-ws.org/vol-2068/symcollab2.pdf Mar. 11, 2018.

Khan, S.A., "How to Detect Humans in an Image in OpenCV Python," https://www.tutorialspoint.com/how-to-detect-humans-in-an-image-in-opencv-python 2022.

\* cited by examiner

Figure 3A:
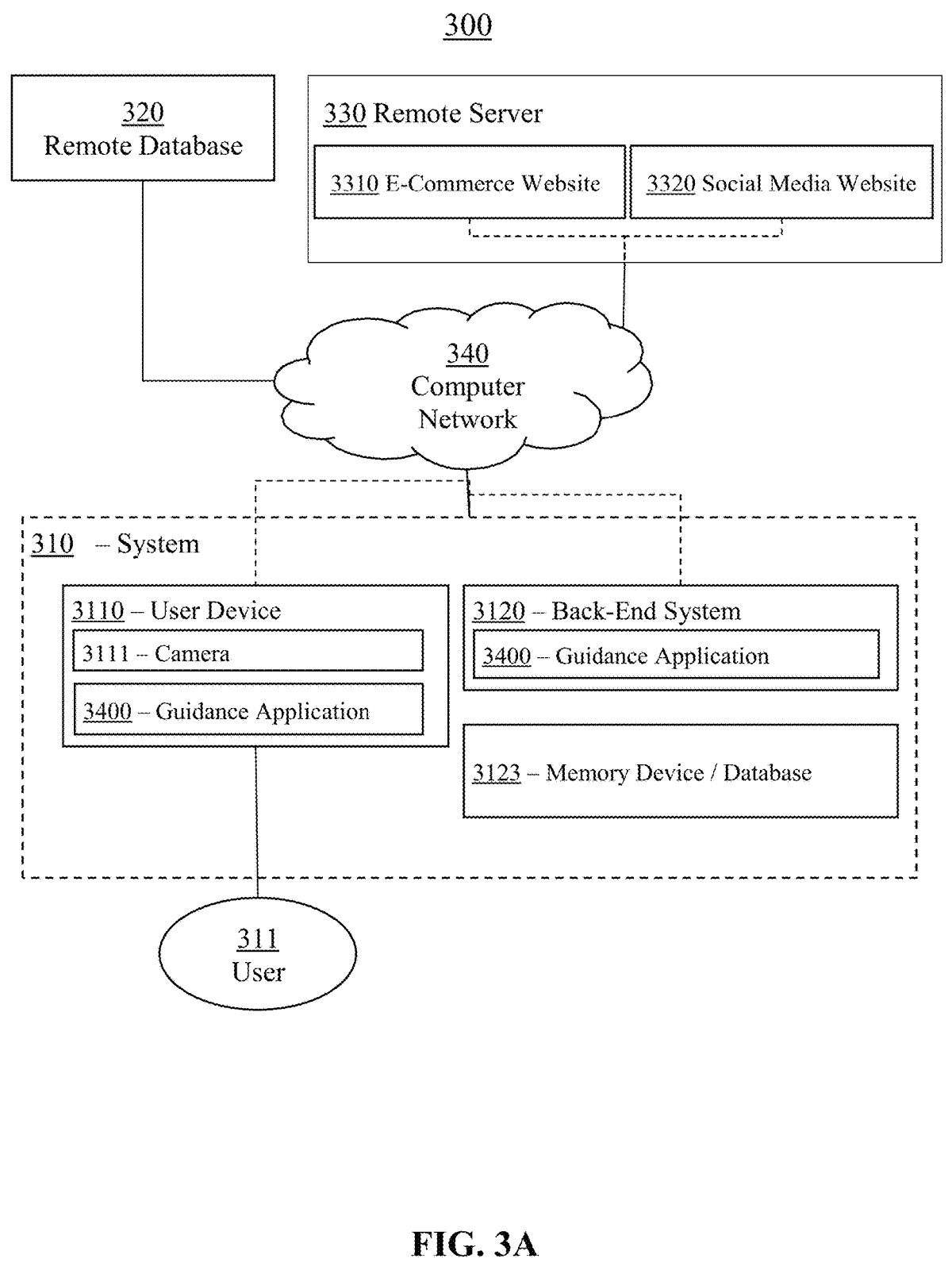

300

| 320 Remote Database | 330 Remote Server |
| | 3310 E-Commerce Website | 3320 Social Media Website |

340
Computer
Network

310   – System

3110 – User Device
3111 – Camera
3400 – Guidance Application

3120 – Back-End System
3400 – Guidance Application

3123 – Memory Device / Database

311
User

Figure 3B:
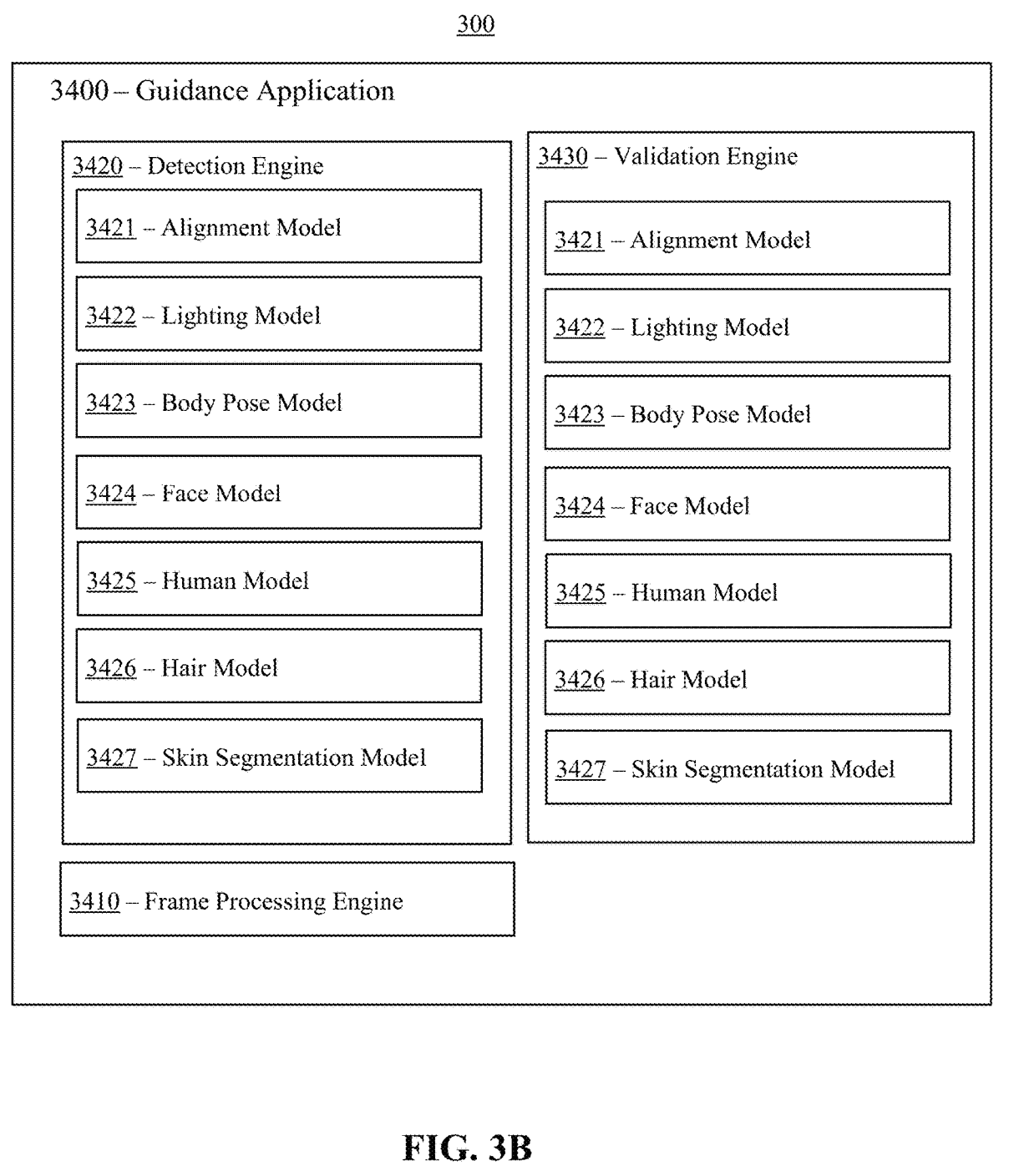

3400 – Guidance Application

3420 – Detection Engine

3421 – Alignment Model

3422 – Lighting Model

3423 – Body Pose Model

3424 – Face Model

3425 – Human Model

3426 – Hair Model

3427 – Skin Segmentation Model

3430 – Validation Engine

3421 – Alignment Model

3422 – Lighting Model

3423 – Body Pose Model

3424 – Face Model

3425 – Human Model

3426 – Hair Model

3427 – Skin Segmentation Model

3410 – Frame Processing Engine

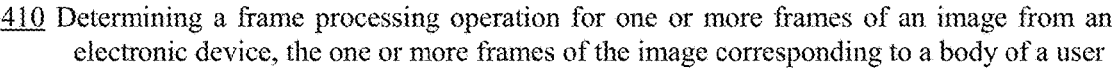

410 Determining a frame processing operation for one or more frames of an image from an electronic device, the one or more frames of the image corresponding to a body of a user 420 Processing the one or more frames of the image from the electronic device based on the frame processing operation to determine if the electronic device is in alignment 430 Processing the one or more frames of the image from the electronic device based on the frame processing operation to determine if the electronic device is in an environment that satisfies a light threshold 440 Processing the one or more frames of the image from the electronic device based on the frame processing operation to determine pre-selected joint points for the body of the user in the one or more frames of the image based on pre-selected joint landmarks defined in a configuration set 450 Processing the one or more frames of the image from the electronic device based on the frame processing operation to determine a face alignment of the user in the one or more frames of the image 460 Processing the one or more frames of the image from the electronic device based on the frame processing operation to determine hair of the user is properly positioned in the one or more frames of the image 470 Processing the one or more frames of the image from the electronic device based on the frame processing operation to determine enough skin of the user is visible in the one or more frames of the image 480 In response to the one or more frames of the image being validated, capturing an image of the user with the pre-selected joint landmarks to enable items to be overlaid on the image of the user

600
602
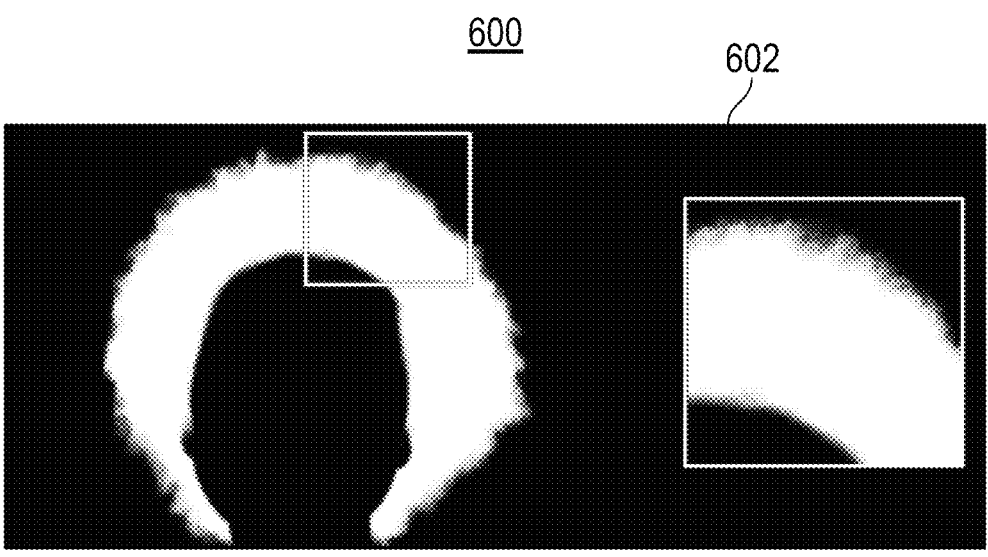
FIG. 6
700
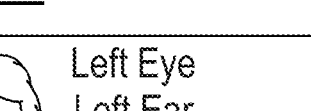
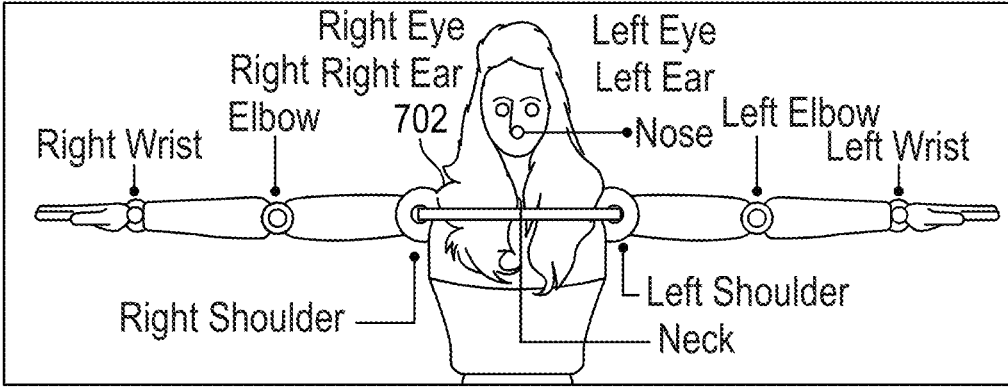
FIG. 7

800

1000

SYSTEM AND METHOD FOR USER INTERFACE GUIDANCE SYSTEM FOR ELECTRONIC DEVICES

TECHNICAL FIELD

This disclosure relates generally to techniques for a user interface guidance system for electronic devices.

BACKGROUND

Uploading images to remote servers is common for various online applications. For example, a virtual fitting room for online shopping requires full-body images uploaded to be processed. However, users often upload images that are unable to be utilized by the virtual fitting rooms. For example, the camera may not be aligned and distort the user, the image may be too dark, or the image may not show all the necessary features of the user.

BRIEF DESCRIPTION OF THE DRAWINGS

To facilitate further description of the embodiments, the following drawings are provided in which:

FIG. 3A illustrates a system for guiding a user to take an image, according to an embodiment;

FIG. 3B illustrates a guidance application for the system of FIG. 3A, according to an embodiment;

FIG. 4 illustrates a flow chart for a method, according to an embodiment;

FIG. 6 illustrates an exemplary hair mask, according to an embodiment;

FIG. 7 illustrates an exemplary hair model analysis, according to an embodiment;

Figure 1:
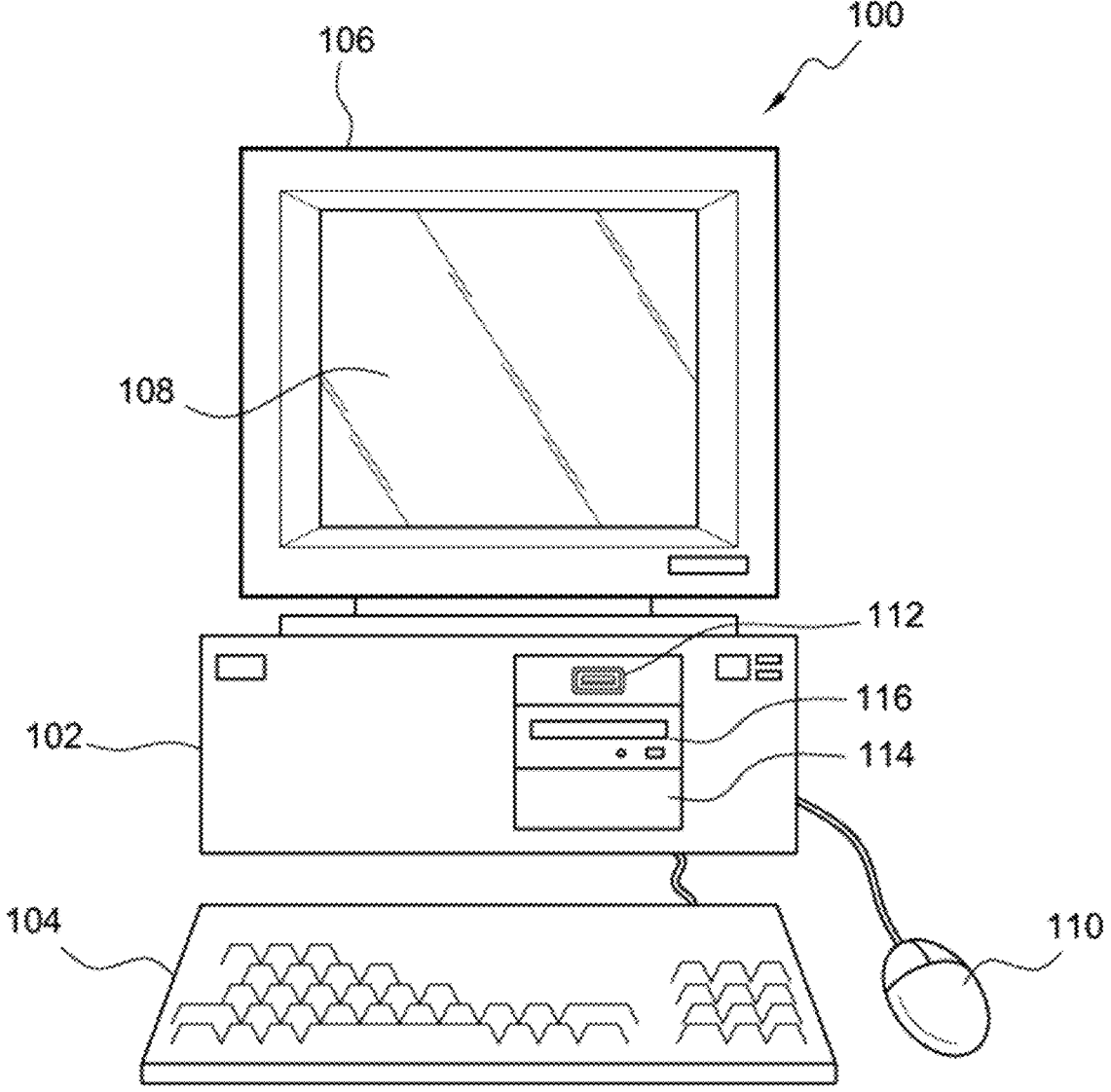
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
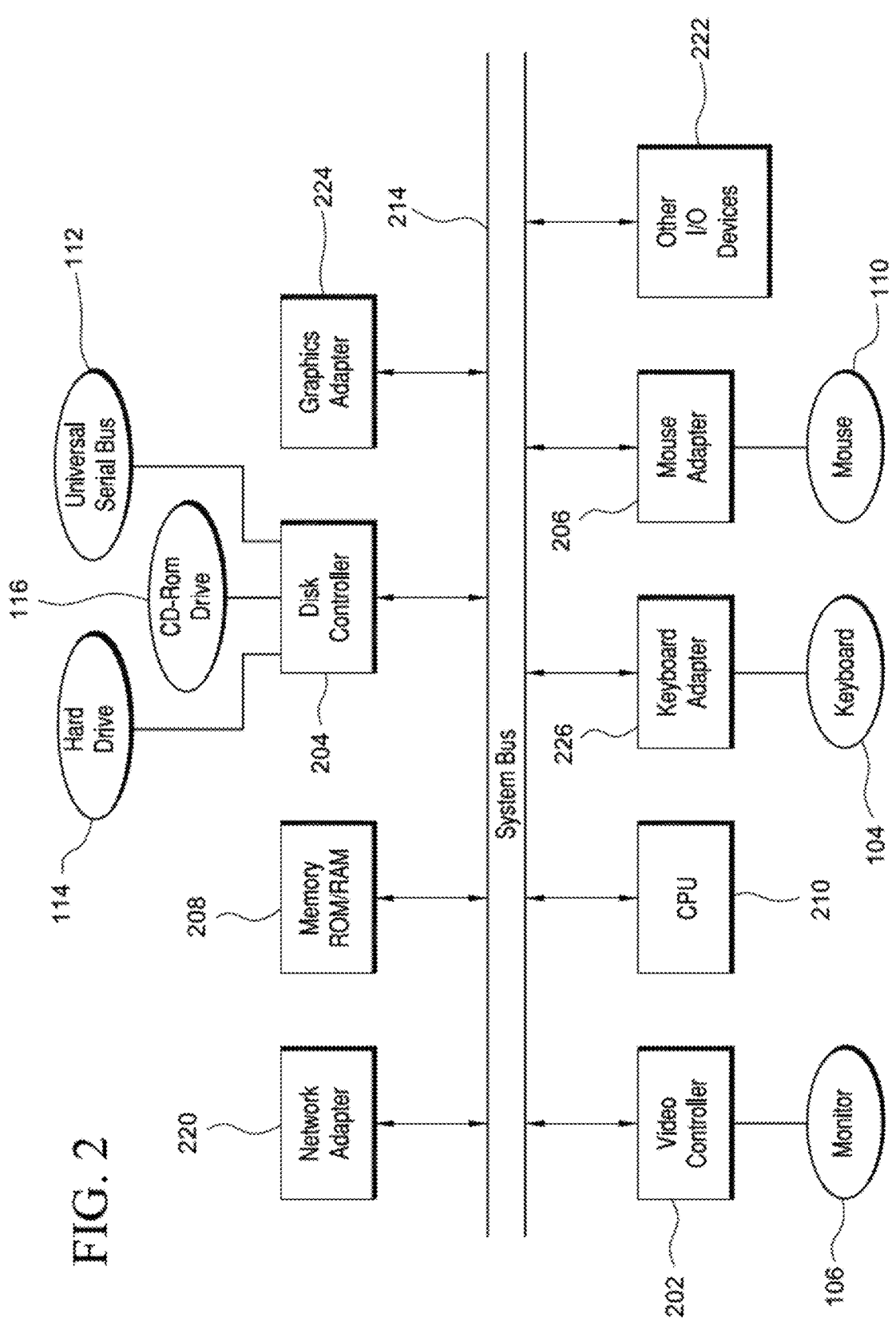
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Turning ahead in the drawings, FIG. 3A illustrates a block diagram for a system 300, according to an embodiment. In many embodiments, system 300 comprises one or more systems (e.g., a system 310 or a back-end system 3120), one or more databases (e.g., a database 320), one or more remote server (e.g., a remote server 330, an e-commerce website 3310, or a social media website 3320), one or more computer networks (e.g., a computer network 340), and/or one or more user devices (e.g., a user device 3110) for one or more users (e.g., a user 311). In many embodiments, user 311 is not part of system 300. In many embodiments, system 300 or system 310 can guide a user to take an image to be uploaded from a user device (e.g., user device 3110) to a remote memory device or database (e.g., a memory device/database 3123 or remote database 320) or a remote server (e.g., a remote server 330, an e-commerce website 3310, or a social media website 3320).

For example, system 300 or system 310 can be configured to guide a user through a series of activities to enable the user to capture an image via a camera (e.g., a camera 3111) before the image can be transmitted, via a computer network (e.g., computer network 340), to another user device, memory device, database, or server (e.g., user device 3110, back-end system 3120, memory device/database 3123, remote database 320, remote server 330, e-commerce website 3310, or social media website 3320).

Systems 300 and 310 are merely exemplary, and embodiments of systems 300 and 310 are not limited to the embodiments presented herein. Systems 300 and 310 can be employed in many different embodiments or examples not specifically depicted or described herein. In many embodiments, systems 300 and 310 can comprise one or more suitable systems, subsystems, servers, modules, elements, and/or models. In some embodiments, system 310 further can include user device 3110 and/or back-end system 3120. In some embodiments, certain elements, modules, devices, or systems of systems 300 and 310 can perform various procedures, processes, and/or activities. In other embodiments, the procedures, processes, and/or activities can be performed by other suitable elements, modules, devices, or systems of systems 300 and 310. Systems 300 and 310 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of systems 300 and 310 described herein.

In many embodiments, system 310, back-end system 3120, remote database 320, remote server 330, e-commerce website 3310, and/or social media website 3320 can each be a computer system, such as computer system 100 (FIG. 1), as described above, and can each be a single computer, a single server, or a cluster or collection of computers or servers, or a cloud of computers or servers. In other embodiments, a single computer system can host system 310, back-end system 3120, remote database 320, remote server 330, e-commerce website 3310, and/or social media website 3320. Additional details regarding system 310, user device 3110, back-end system 3120, remote database 320, remote server 330, e-commerce website 3310, and social media website 3320 are described herein.

In some embodiments, system 310, user device 3110, back-end system 3120, and/or each of their respective elements, modules, and/or models (e.g., guidance application 3400) can be modules of computing instructions (e.g., software modules) stored at non-transitory computer readable media that operate on one or more processors. In some embodiments, system 300 and/or system 310 does not include one or more of user device 3110, camera 3111, or guidance application 3400. As an example, guidance application 3400 can be provided by or with user device 3110, and in other embodiments, guidance application 3400 can be added to user device 3110 via an app store, where an entity operating or controlling one or more remote database 320, remote server 330, or back-end system 3120 creates and uploads (or otherwise provides) guidance application 3400 to the app store (whether through a single app or more than one app). In these or other embodiments, system 310, user device 3110, back-end system 3120, and/or each of their respective elements, modules, and/or models can be implemented in hardware or combination of hardware and software. In many embodiments, the operator and/or administrator of system 310, user device 3110, and/or back-end system 3120 can manage system 310, user device 3110, back-end system 3120, and/or their respective processor(s) and/or memory storage unit(s) using the respective input device(s) and/or display device(s).

In a number of embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

System 300, system 310, user device 3110, back-end system 3120, database 320, remote server 330, e-commerce website 3310, and/or social media website 3320 can be implemented using any suitable manner of wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can be in data communication, through computer network 340, with remote database 320, remote server 330, e-commerce website 3310, and/or social media website 3320. User device 3110 can be in data communication, directly or through computer network 340, with back-end system 3120. Computer network 340 can include one or more of a computer network, a telephone network, the Internet, and/or an internal network not open to the public (e.g., a private network and/or a virtual private network (VPN)), etc.

Meanwhile, in many embodiments, system 310 also can be configured to communicate with one or more databases (e.g., memory device/database 3123, remote database 320, etc.). Examples of the one or more databases can include a cloud storage for backing up and/or sharing photographs, a database for storing configuration sets for configuring the masks, among other information. In some embodiments, for any particular database of the one or more databases (e.g., memory device/database 3123 and/or remote database 320), that particular database can be stored on a single memory storage unit or the contents of that particular database can be spread across multiple ones of the memory storage units storing the one or more databases, depending on the size of the particular database and/or the storage capacity of the memory storage units. Further, the one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, RocksDB, and IBM DB2 Database.

In a number of embodiments, back-end system 3120 can include one or more models that interface with one or more applications or APIs (an application programming interface) executed on a user device (e.g., user device 3110) for a user (e.g., user 311). The one or more models can include one or more suitable machine learning algorithms, pre-trained and/or re-trained iteratively based on a first training image dataset stored in memory device/database 3123 or remote database 320, to determine or detect human poses (e.g., standing, sitting, running, forward-facing or not, etc.), pose landmarks (e.g., knee joints, elbow joints, etc.), human hair, and/or skin regions (e.g., the arms, legs, face, etc.) for a human body in an image. In some of these embodiments, only one of memory device/database 3123 or remote database 320 can be part of or used in system 300. In several embodiments, back-end system 3120 can be a hardware and/or software module of a user device 3110 so that images can be processed in a single device without network until the images are ready for upload.

In many embodiments, remote server 330, e-commerce website 3310, and/or social media website 3320 can host one or more websites and/or mobile application servers that receive images uploaded, via a computer network (e.g., computer network 340), from a user device (e.g., user device 3110). Remote server 330, e-commerce website 3310, and/or social media website 3320 can store, transmit, distribute, and/or manage the images received for various uses. For example, e-commerce website 3310 can receive and store an uploaded full-body image from user 311 for its virtual fitting room. When user 311 chooses to virtually try on an apparel (e.g., a dress, a pair of shoes, a blazer, etc.) on e-commerce website 3310, e-commerce website 3310 can be configured to retrieve the full-body image from the profile and transmit, via computer network 340, the full-body image and an image of the apparel to be rendered and/or displayed on user device 3110. In some embodiments, e-commerce website 3310 further can overlay the apparel image on the full-body image before transmitting the result of virtual apparel fitting for display on user device 3110. In different or similar embodiments, user device 3110 can generate the result of virtual apparel fitting. In further examples, social media website 3320 can receive, store, and/or distribute images uploaded from user device 3110 by user 311.

In some embodiments, user device 3110 can be used by one or more users (e.g., user 311) to interface with system 310, back-end system 3120, remote database 320, remote server 330, e-commerce website 3310, and/or social media website 3320. For example, user device 3110 can, via various user interfaces (e.g., webpages or applications, etc.), transmit commands from user 311 to system 310, back-end system 3120, remote database 320, remote server 330, e-commerce website 3310, and/or social media website 3320, and receive responses and/or notices from system 310, back-end system 3120, remote database 320, remote server 330, e-commerce website 3310, and/or social media website 3320. User device 3110 can take, via camera 3111, an image for user 311 and transmit, via computer network 340, the image to remote database 320, remote server 330, e-commerce website 3310, and/or social media website 3320.

In many embodiments, system 310 and/or user device 3110 can be configured to guide a user through activities to assist with taking images of the user and processing the images before transmitting the images to remote database 320, remote server 330, e-commerce website 3310, and/or social media website 3320 in order to assist with a virtual try on application. System 310 and/or user device 3110 can process images via a guidance application 3400 that can be implemented on the user device 3110, the back-end system 3120, and/or a combination of the user device 3110 and the back-end system 3120.

In a number of embodiments, the guidance application 3400 analyzes frames from the camera of the user's electronic device while the user is setting up the electronic device to take an image of the user and outputs instructions to inform the user of when they are in the proper position for the image to be taken.

Turning to the embodiment illustrated in FIG. 3B, the guidance application 3400 can include a frame processing engine 3410, a detection engine 3420, and a validation engine 3430. The guidance application 3400 can coordinate the operation of the frame processing engine 3410, the detection engine 3420, and the validation engine 3430. For example, the detection engine 3420 is generally associated with the detection of features in a frame of the camera, such as detecting camera alignment, environmental lighting, body pose (e.g., body joint) landmarks, face alignment, hair positioning, and skin exposure. The validation engine 3430 is generally associated with validating the features detected by the detection engine 3420. For example, the detection engine 3420 can detect body pose landmarks, and the validation engine 3430 can validate the body pose landmarks are in proper alignment (e.g., the user is in a particular pose in the frame of the camera). In another example, the detection engine 3420 can detect portions of the user that are skin pixels, and the validation engine 3430 can validate the skin pixels satisfy a threshold (e.g., the user is showing enough skin).

In some embodiments, the detection engine 3420 and the validation engine 3430 can utilize the following hierarchy to enable the guidance application 3400 to utilize the least amount of computing resources and to ensure the messages displayed to the user are synchronized with the appropriate action:

1. Device (e.g., camera) misalignment
2. Back or side of body is facing camera
3. No face detected
4. Low light condition
5. Multiple people
6. Body too close to camera
7. Body too far from camera
8. Legs not visible
9. Body too close to the left side of the frame
10. Body too close to the right side of the frame
11. Arms not at the sides of the body 12. Legs not straight
13. Legs too wide
14. Body not facing forward
15. Body not standing straight
16. Face not facing forward
17. Hair is in the front
18. Not enough skin exposure on legs
19. Not enough skin exposure on arms In some embodiments, the frame processing engine 3410 can determine a frame processing operation for one or more frames of an image from an electronic device, such as a live image detection stage or a still image detection stage. For example, the live image detection stage corresponds to an electronic device (e.g., mobile device) that is in a live camera mode (e.g., the resulting image will comprise multiple image frames) and the still image detection stage correspond to an electronic device that is in a still camera mode (e.g., the resulting image will comprise a single image frame). In some embodiments, the frame processing engine 3410 can determine an output frame buffer to determine a timing sequence to process frames on the display of the electronic device. For example, the frame buffer can determine when messages and visual cues can be displayed to the user to be synchronized with the movements of the user and to enable the user to respond to the message and/or visual cues. In some embodiments, the frame processing operation can minimize memory consumption by utilizing coordinated analysis by the detection engine 3420 and the validation engine 3430. For example, the frame processing engine 3410 can utilize a hierarchy of processing to enable the detection engine 3420 and the validation engine 3430 to execute functions at a certain time to conserve computing resources. The frame processing engine 3410 is configured to implement activity 410 of method 400 of FIG. 4. The frame processing engine 3410 is discussed in more detail below in connection with activity 410 of method 400 of FIG. 4.

In the illustrated embodiment of FIG. 3B, the detection engine 3420 can include an alignment model 3421, a lighting model 3422, a body pose model 3423, a face model 3424, a human model 3425, a hair model 3426, and a skin segmentation model 3427.

In some embodiments, the alignment model 3421 is configured to determine an electronic device is properly aligned with its current environment in a frame of a camera of the electronic device. For example, the alignment model 3421 can utilize an accelerometer of the electronic device and outputs a first identifier (e.g., point, target, circle, etc.) in the middle of the screen of the electronic device and outputs a second identifier for the user to match with the first identifier. In this embodiment, the alignment model 3421 analyzes the accelerometer data while the user moves the second identifier over the first identifier (e.g., rotates the electronic device) to determine that the electronic device is at a proper angle to capture an image of the user. The alignment model 3421 is configured to implement activity 420 of method 400 of FIG. 4. The alignment model 3421 is discussed in more detail below in connection with activity 420 of method 400 of FIG. 4.

In some embodiments, the lighting model 3422 is configured to determine proper lighting conditions in the environment in the frame of the camera of the electronic device. For example, the lighting model 3422 can analyze the brightness and isoSpeedRating EXIF information from each frame of the camera to determine if the lighting conditions satisfy a threshold. If the lighting condition threshold is not satisfied, the electronic device can display instructions to the user to increase or decrease the lighting in the frame of the camera. The lighting model 3422 is configured to implement activity 430 of method 400 of FIG. 4. The lighting model 3422 is discussed in more detail below in connection with activity 430 of method 400 of FIG. 4.

In some embodiments, the body pose model 3423 is configured to determine body landmarks for the user in the frame of the camera. For example, the body pose model 3423 can determine landmarks for the user in the frame of the camera by virtually placing identifiers in specific positions on the user. In some embodiments, the electronic device can determine landmarks such as left shoulder, right shoulder, left wrist, right wrist, etc. The body pose model 3423 can analyze the body landmarks to determine if the user is in a proper body pose. If the user is not in a proper body pose, the electronic device 3423 can output an instruction to the user to reposition themselves in the frame of the camera. In some embodiments, the body pose model 3423 can analyze the user in the frame of the camera to determine if the user is in proper attire. For example, the body pose model 3423 can analyze the user in the frame of the camera to determine the clothes the user is wearing are tight enough (e.g., not too baggy so the virtual try on assistant can properly overlay images of clothing on the image of the user). In some embodiments, the body pose model 3423 can work in conjunction with the skin segmentation model 3427 to identify body landmarks and human skin, thereby identifying which parts of the user include clothing. In some embodiments, if the clothing on the user is beyond a threshold distance from the body landmarks (e.g., indicating clothes are too baggy), the electronic device 3423 can output an instruction to the user to put on a different outfit. The body pose model 3423 is configured to implement activity 440 of method 400 of FIG. 4. The body pose model 3423 is discussed in more detail below in connection with activity 440 of method 400 of FIG. 4.

Figure 5:
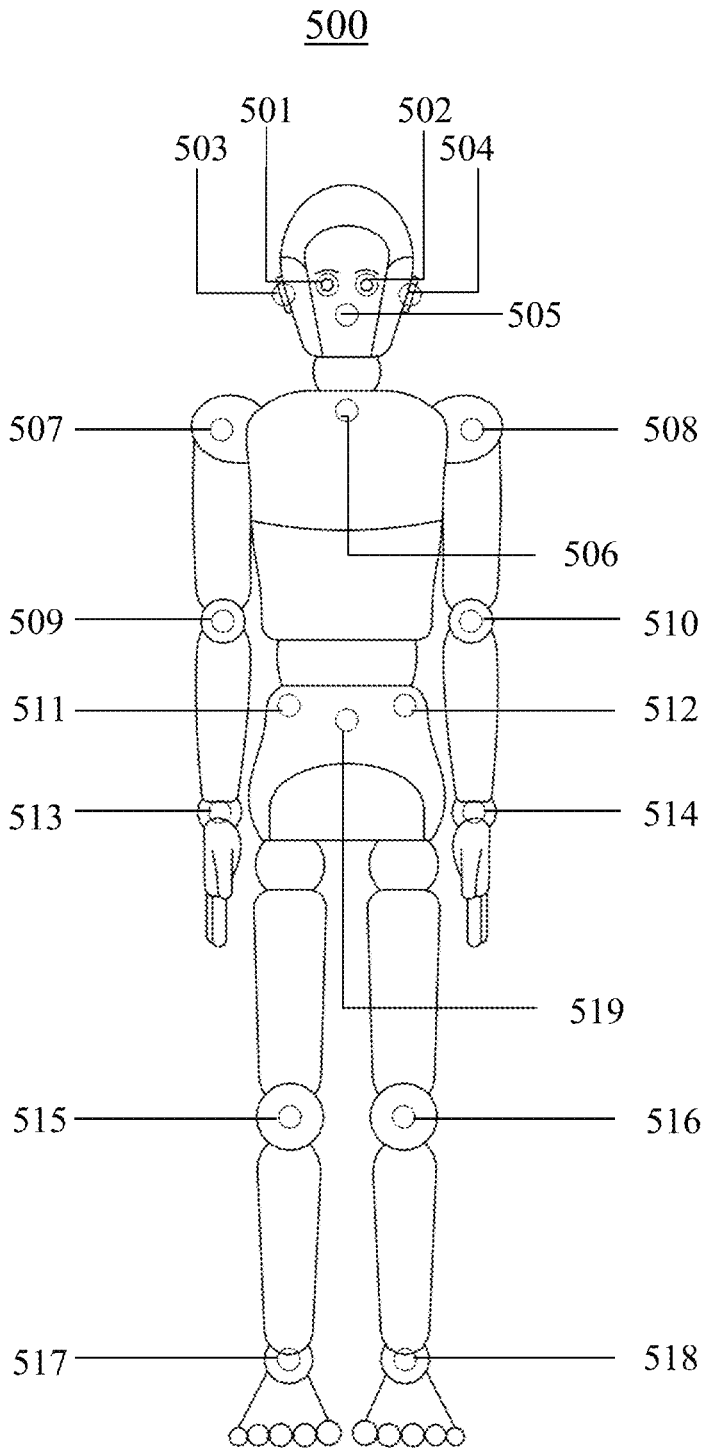
FIG. 5 illustrates pose landmarks for a human body, according to an embodiment.

Turning ahead in the drawings, FIG. 5 illustrates pose landmarks for a human body 500, according to an embodiment that can be generated by the body pose model 3423. The pose landmarks in FIG. 5 can include eyes 501 and 502, ears 503 and 504, a nose 505, a neck joint 506, shoulder joints 507 and 508, elbow joints 509 and 510, hip joints 511 and 512, wrist joints 513 and 514, knee joints 515 and 516, ankle joints 517 and 518, and a root 519. The pose landmarks are merely exemplary and not limited to the embodiments presented herein. In many embodiments, system 300 (FIG. 3A), system 310 (FIG. 3A), user device 3110 (FIG. 3A), back-end system 3120 (FIG. 3A), and/or body pose model 3423 can be suitable to determine some or all of the pose landmarks in FIG. 5. In various embodiments, a body pose model for determining joint landmarks can be trained to determine some or all of the pose landmarks in FIG. 5 and/or additional pose landmarks not shown in FIG. 5.

Returning to FIG. 3B, in some embodiments, the face model 3424 is configured to determine the users face is properly oriented in the frame of the camera. For example, the face model 3424 can analyze the frames of the camera to produce an array of rectangles that identify the location and orientation of a user's face and a chin landmark. Based on the positioning of the chin landmark, the face model 3424 can determine if the users face is properly oriented in the frame of the camera. If the user's face is not properly aligned, the electronic device can output instructions for the user to reposition their face in the frame of the camera. The face model 3424 is configured to implement activity 450 of method 400 of FIG. 4. The face model 3424 is discussed in more detail below in connection with activity 450 of method 400 of FIG. 4.

In some embodiments, the human model 3425 is configured to determine that only one user is in the frame of the camera. For example, the human model 3425 can analyze the frames of the camera to produce an array of rectangles that identify the location and boundary of a human. Based on the positioning of the boundaries, the human model 3425 can determine if one or more individuals are in the frame of the camera. If there is more than one user in the frame of the camera, the electronic device can output instructions for the user to ensure that only one user is in the frame of the camera. Once it is determined that only one user is in the frame of the camera, the human model 3425 verifies that the boundary of the user is within the frame of the camera. If the boundary is too close to the frame of the camera, the electronic device can output instructions for the user to move back on the frame of the camera so that their whole body is visible. In some embodiments, the human model 3425 can analyze the array of rectangles and the landmarks from the body pose model 3423 to determine that the entire body of the user is within the frame of the camera. In one embodiment, the human model 3425 can compare the size and location of the human rectangle relative to the size of the frame of the camera. In some embodiments, the human model 3425 can analyze the array of rectangles and the landmarks from the body pose model 3423 to ensure that at least one of the ankles of the user is present in the frame of the camera. The human model 3425 is discussed in more detail below in connection with the method 400 of FIG. 4.

In some embodiments, the hair model 3426 is configured to determine hair of the user is properly positioned in the frame of the camera. For example, the hair model 3426 can generate a mask that indicates which parts of the frame of the camera contain human hair. The hair model 3426 can utilize the mask and analyze each pixel between a right shoulder landmark and a left shoulder landmark to determine how many pixels contain human hair. The percentage of pixels containing hair is compared to a threshold. If the percentage is above the threshold, the electronic device can output an instruction to the user to move their hair behind their shoulders. The hair model 3426 is configured to implement activity 460 of method 400 of FIG. 4. The hair model 3426 is discussed in more detail below in connection with activity 460 of method 400 of FIG. 4.

In some embodiments, the skin segmentation model 3427 is configured to determine the user is showing enough skin in the frame of the camera. For example, the skin segmentation model 3427 can generate a mask that indicates which parts of the frame of the camera contain human skin. The skin segmentation model 3427 can utilize the mask and analyze each pixel between landmarks for the arms and legs, respectively, to determine how many pixels contain human skin. The percentage of pixels containing skin is compared to a threshold. If the percentage is above the threshold, the electronic device can output an instruction to the user to adjust their clothing. The skin segmentation model 3427 is configured to implement activity 470 of method 400 of FIG. 4. The skin segmentation model 3427 is discussed in more detail below in connection with activity 470 of method 400 of FIG. 4.

The guidance application 3400 can coordinate the operation of the frame processing engine 3410, the detection engine 3420, and the validation engine 3430 in a number of phases to reduce processing time, computing resources, and memory storage utilized when assisting a user with taking an image.

Figure 9:
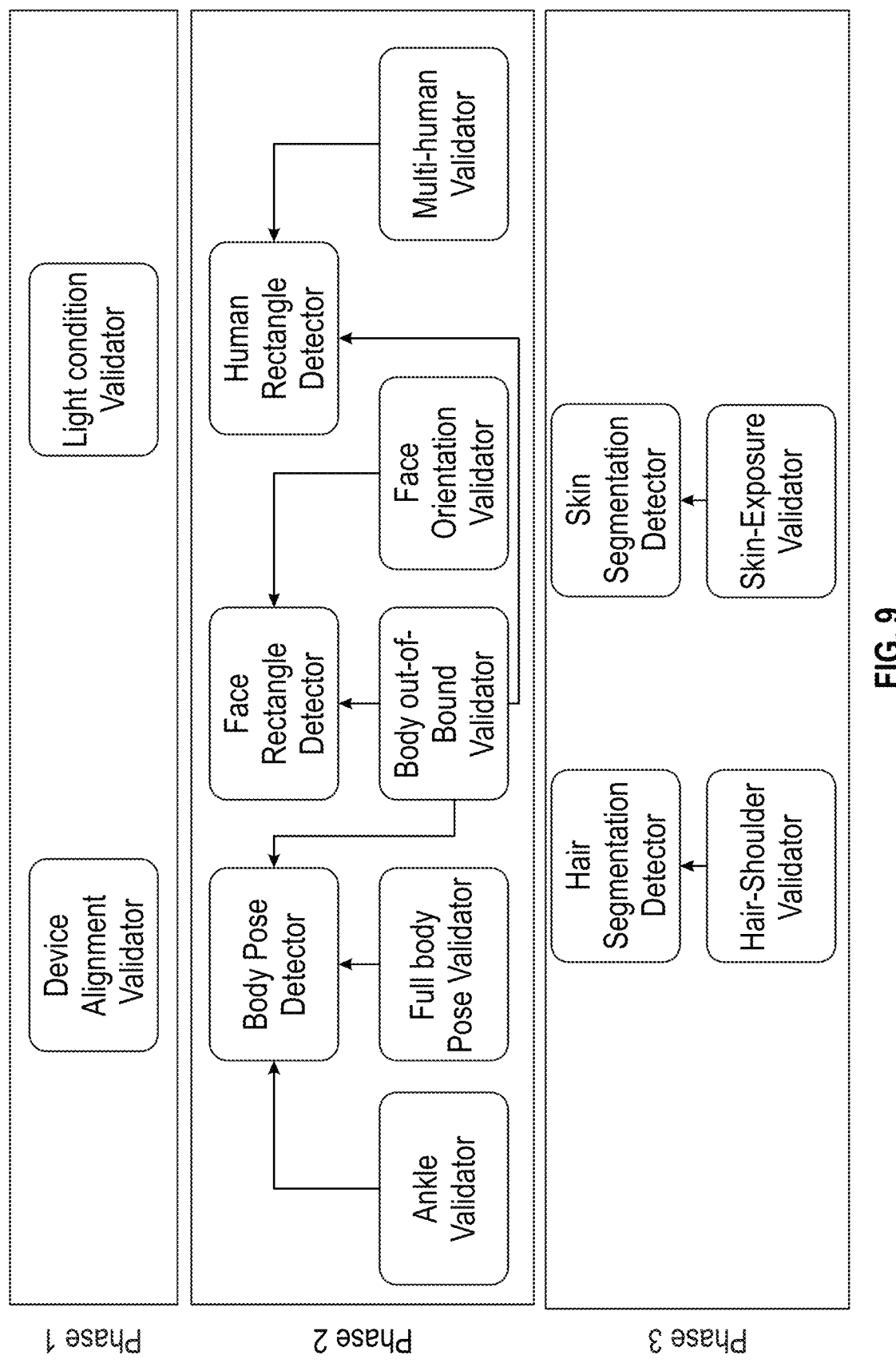
FIG. 9 illustrates an exemplary operation architecture, according to an embodiment.

Turning briefly to FIG. 9, an operation architecture 900 is illustrated for coordination of the detection engine 3420, and the validation engine 3430. In the illustrated embodiment, the operation architecture 900 includes three phases that can be completed in sequence to conserve computing resources. In some embodiments, the first phase includes analyzing the frames of an image of a camera using the alignment model 3421 and the lighting model 3422. In some embodiments, the operation architecture 900 does not proceed to the second or third phase until the alignment and lighting thresholds are validated in the validation engine 3430. Once the alignment and lighting thresholds are validated in the validation engine 3430, the operation architecture 900 can proceed to the second phase where the detection engine 3420 utilizes the body pose model 3423, the face model 3424, and the human model 3425 to detect body pose, face, and body alignment features as discussed in detail below in connection with FIG. 4. The operation architecture 900 can then proceed to where the validation engine 3430 utilizes the body pose model 3423, the face model 3424, and the human model 3425 to validate the body pose, face, and body alignment features as discussed in detail below in connection with FIG. 4. Once the body pose, face, and body alignment features are validated in the validation engine 3430, the operation architecture 900 can proceed to the third phase where the detection engine 3420 utilizes the hair model 3426 and the skin segmentation model 3427 to detect hair and skin features as discussed in more detail below in connection with FIG. 4. The operation architecture 900 can then proceed to where the validation engine 3430 utilizes the hair model 3426 and the skin segmentation model 3427 to validate the hair and skin features as discussed in more detail below in connection with FIG. 4.

Returning to FIG. 3A, in certain embodiments, system 310 and/or user device 3110 can be desktop computers, laptop computers, mobile devices, and/or other endpoint devices used by one or more users (e.g., user 311). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a net-book computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

Turning ahead in the drawings, FIG. 4 illustrates a flow chart for a method 400 for guiding a user through a detection and validation process to capture and image of the user, according to an embodiment. In many embodiments, method 400 can be implemented via execution of computing instructions on one or more processors. Method 400 is merely exemplary and is not limited to the embodiments presented herein. Method 400 can be employed in many different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 400 can be performed in any suitable order. In still other embodiments, one or more of the procedures, the processes, the activities, and/or the blocks of method 400 can be combined or skipped.

In many embodiments, system 300 (FIG. 3A), system 310 (FIG. 3A), user device 3110 (FIG. 3A), back-end system 3120 (FIG. 3A), and/or guidance application 3400 (FIG. 3A-3B), can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3A), system 310 (FIG. 3A), user device 3110 (FIG. 3A), back-end system 3120 (FIG. 3A), and/or guidance application 3400 (FIGS. 3A-3B). The processor(s) can be similar or identical to the processor(s) described above with respect to computer system 100 (FIG. 1).

In many embodiments, method 400 can include activity 410 of determining a frame processing operation for one or more frames of an image from an electronic device. In some embodiments, the one or more frames of the image correspond to a body of a user. In some embodiments, the frame processing operation manages how fast and in what order the processing should be done. In some embodiments, the frame processing operation enables grouping of different stages of frame processing. For example, consider a scenario with two different types of frame processors that contain different set of detectors for live frames and for still captured photos. In this embodiment, the frame processing operation can store various sequences of operations to process live frames and to process still captured frames. In some embodiments, the frame processing operation can define interfaces for operation results to be displayed and/or interacted with to store and/or modify the results. In some embodiments, the frame processing operation can determine when an operation starts, stops, or is cancelled. In some embodiments, the frame processing operation can utilize an observations map (e.g., a key-valued paired of observations) from prior operations and input the observations map into a main logic of the operation, which can append its own result into the observation map and pass it onto a subsequent dependent operation. In some embodiments, the dependencies between operations can determine the order of which components of the detection engine 3420 (FIG. 3B) and/or validation engine 3430 (FIG. 3B) are being invoked.

In some embodiments, determining the frame processing operation for the one or more frames of the image from the electronic device can include determining if the system is in a live image detection stage or a still image detection stage. For example, the live image detection stage corresponds to an electronic device (e.g., mobile device) that is in a live camera mode (e.g., the resulting image will comprise multiple image frames) and the still image detection stage correspond to an electronic device that is in a still camera mode (e.g., the resulting image will comprise a single image frame). In some embodiments, each stage corresponds to a processing speed. For example, the live image detection stage can correspond to a first processing speed and the still image detection stage can correspond to a second processing speed that is different than the first processing speed. For example, the second processing speed can be faster than the first processing speed because the still image detection stage has fewer image frames to process. In some embodiments, the frame processing operation can determine an output frame buffer to determine a timing sequence to process frames. For example, the frame buffer can determine a when messages and visual cues can be displayed to the user to be synchronized with the movements of the user and to enable the user to respond to the message and/or visual cues. In some embodiments, the frame processing operation can minimize memory consumption by utilizing coordinated analysis by the detection engine 3420 (FIG. 3B) and the validation engine 3430 (FIG. 3B).

In many embodiments, method 400 can include activity 420 of processing the one or more frames of the image from the electronic device based on the frame processing operation to determine if the electronic device is in alignment. In some embodiments, alignment corresponds to the electronic device being aligned with a user of the device. In particular, aligning the electronic device so that the full body of the user is visible on a user interface of the electronic device while using the camera of the electronic device. In some embodiments, activity 420 can include utilizing an accelerometer of the electronic device and outputs a first identifier (e.g., point, target, circle, etc.) in the middle of the screen of the electronic device and outputs a second identifier for the user to match with the first identifier. In some embodiments, activity 420 can include analyzing the accelerometer data while the user moves the second identifier over the first identifier (e.g., rotates the electronic device) to determine that the electronic device is at a proper angle to take a photo. If the electronic device is tilted too much, the head or feet of the user can be cut off or can appear larger than they are supposed to. In some embodiments, activity 420 utilizes the accelerometer data (e.g., yaw, pitch, and roll) to calculate if the electronic device is aligning relatively perpendicular to the ground. In this embodiment, alignment corresponds to a ground surface and not the user.

In some embodiments, processing the one or more frames of the image from the electronic device to determine if the electronic device is in alignment can include accessing the accelerometer of the electronic device to determine a first measurement. For example, the first measurement can correspond to the accelerometer data (i.e. Yaw, pitch, and roll). In some embodiments, activity 420 can include transmitting a first signal to output a first identifier on a screen of the electronic device based on the first measurement. In some embodiments, the first identifier can be output in a stationary position on the screen of the electronic device. For example, the first identifier can be a circle or other shape that is positioned in one location on the screen of the electronic device. In some embodiments, activity 420 can include transmitting a second signal to output a second identifier on the screen of the electronic device. In some embodiments, the second identifier is configured to move on the screen based on movement of the electronic device by the user. For example, the second identifier can be a shape similar to the first identifier in order for the user to match the first and second identifiers together and/or position the second identifier inside of the first identifier. In some embodiments, activity 420 can include, in response to the user moving the electronic device, accessing the accelerometer of the electronic device to determine a second measurement for the second identifier. For example, the second measurement can correspond to the accelerometer data (e.g., yaw, pitch, and roll). In some embodiments, activity 420 can include determining the electronic device is in alignment when the first measurement and the second measurement are within a threshold distance of each other corresponding to the first identifier matching the second identifier on the screen of the electronic device. For example, the first identifier can match the second identifier when the second identifier is within a range between 70%-100% of the first identifier (e.g., the accelerometer data for the first measurement is within a range of the accelerometer data for the second measurement). In some embodiments, activity 420 can include transmitting a third signal to display an alignment message on the screen of the electronic device indicating to the user that the electronic device is aligned. For example, a message can be displayed to the user indicating that the electronic device is aligned and the process can proceed to the next processing activity. In some embodiments, if the electronic device is determined to not be aligned, a message can be displayed to the user indicating that the electronic device is not aligned and processing cannot proceed. In some embodiments, the message can be output via a speaker of the electronic device to further instruct and/or inform the user of the electronic device.

In many embodiments, method 400 can include activity 430 of processing the one or more frames of the image from the electronic device based on the frame processing operation to determine if the electronic device is in an environment that satisfies a light threshold. The light threshold ensures that a subsequent photograph captured of the user will include defined edges and high contrast ratio. In some embodiments, processing the one or more frames of the image from the electronic device based on the frame processing operation to determine if the electronic device is in an environment that satisfies the light threshold can include analyzing a brightness measurement of each of the one or more frames of the image. For example, the brightness measurement can be determined based on converting the RGB pixels to hue saturation value (HSV) color space and measuring the color value to determine the brightness measurement. In some embodiments, activity 430 can include analyzing isoSpeedRating EXIF information of each of the one or more frames of the image. In some embodiments, activity 430 can include, in response to the brightness measurement and isoSpeedRating EXIF information satisfying the light threshold, transmitting a signal to display a light message on the screen of the electronic device for the user indicating that the electronic device is in an environment that satisfies the light threshold. In some embodiments, the light threshold corresponds to a brightness threshold of −2.0 and an isoSpeedRating threshold of 1000. For example, poor lighting can correspond to a brightness measurement that is less than the brightness threshold and an isoSpeedRating that is less than or equal to the isoSpeedRating threshold. If the light threshold is not satisfied, a message can be displayed on the electronic device indicating the user needs to improve the lighting in their current environment.

In many embodiments, method 400 can include activity 440 of processing the one or more frames of the image from the electronic device based on the frame processing operation to determine pre-selected joint points for the body of the user in the one or more frames of the image based on pre-selected joint landmarks defined in a configuration set. In many embodiments, activity 440 can include training a body pose model to determine body joint landmarks for a human body based on body poses in a first training image data set and respective landmarks for each of the body poses. The body pose model can include any suitable machine learning algorithms and be implemented via any suitable frameworks. Examples of the body pose model can include neural networks, tree ensembles, support vector machines, generalized linear models, etc. The body pose model can be implemented by system 300 (FIG. 3A), system 310 (FIG. 3A), user device 3110 (FIG. 3A), back-end system 3120 (FIG. 3A), and/or guidance application 3400 (FIG. 3A-3B)), via Core ML framework by Apple Inc. of Cupertino, California, United States of America, ML Kit framework by Google of Mountain View, California, United States of America, OpenPose framework by Carnegie Mellon University of Pittsburgh, Pennsylvania, United States of America, etc.

In some embodiments, activity 440 can include training the body pose model to determine body landmarks for a human body based on a first training image dataset that includes body poses shown in selected images as training input data and respective body landmarks for each of the body poses as training output data. Exemplary body landmarks for a body can include the eyes, ears, nose, joints (e.g., the neck joint, the shoulder joints, the hip joints, the wrist joints, etc.), and so forth. The first training image dataset can be retrieved from a database (e.g., memory device/database 3123 (FIG. 3A)). In many embodiments, activity 440 can be performed iteratively with the first training image dataset updated automatically or manually. In certain embodiments, the body pose model can be pre-trained, and activity 440 can be performed only once or skipped.

In some embodiments, activity 440 can include receiving a configuration set from a database. For example, the database for storing configuration sets can include memory storage unit 208 (FIG. 2), memory device/database 3123 (FIG. 3A) and/or remote database 320 (FIG. 3A). An exemplary configuration set can include one or more formulas and/or parameters for determining one or more body poses. It is advantageous to use different configuration sets to adapt to different applications of method 400. For example, the configuration set used for determining body poses can be selected in order to adjust the standard of body poses based on the settings by the user and/or the settings by a system administrator.

In some embodiments, the configuration set can include one or more geometric formulas configured to define the region(s) of interest for various body poses. The geometric formulas can be associated with body landmarks (e.g., joint landmarks) and one or more reference points also defined in the configuration set (e.g., the midpoint between the right shoulder joint and the right elbow). In several embodiments, the one or more geometric formulas can include (a) one or more line segment formulas associated with one or more first pairs of the joint landmarks and the one or more reference points; and/or (b) one or more curve segment formulas associated with one or more second pairs of the joint landmarks and the one or more reference points.

In some embodiments, activity 440 can include verifying, via the body pose model, as trained, that the body of the user in the one or more frames of the image corresponds to a predetermined pose in the configuration set. In certain embodiments, activity 440 can verify the user body pose when the matching between the user body pose and the predetermined pose is above a predetermined threshold. The pose comparison can be performed by any suitable pose detection APIs (e.g., pose detection APIs under the Vision framework, ML Kit framework, OpenPose framework, etc.), and the threshold can be any suitable percentage (e.g., 75%, 80%, etc.). In some embodiments, activity 440 can include verifying if the user is in a certain pose such as: bending legs (left and right), bending elbows (left and right), raising arms (left and right), bending body (e.g., not standing straight), or feet too wide. If the user is determined to be in one of these certain poses, a message can be displayed to the user to maneuver into a new position. For example, the message can ask the user to please stand straight, or to lower their arms.

In many embodiments, method 400 can include activity 450 of processing the one or more frames of the image from the electronic device based on the frame processing operation to determine a face alignment of the user in the one or more frames of the image. In some embodiments, the face model is configured to determine the users face is properly oriented in the frame of the camera. For example, the face model can analyze the frames of the camera to produce an array of rectangles that identify the location and orientation of a user's face and a chin landmark. Based on the positioning of the chin landmark, the face model can determine if the users face is properly oriented in the frame of the camera. If the user's face is not properly aligned, the electronic device can output instructions for the user to reposition their face in the frame of the camera.

In many embodiments, activity 450 can include training a face model to determine one or more chin landmarks for a human face based on face poses in a first training image dataset and respective landmarks for each of the face poses. The face model can include any suitable machine learning algorithms and be implemented via any suitable frameworks. Examples of the face model can include neural networks, tree ensembles, support vector machines, generalized linear models, etc. The face model can be implemented by system 300 (FIG. 3A), system 310 (FIG. 3A), user device 3110 (FIG. 3A), back-end system 3120 (FIG. 3A), and/or guidance application 3400 (FIG. 3A-3B)), via Core ML framework by Apple Inc. of Cupertino, California, United States of America, ML Kit framework by Google of Mountain View, California, United States of America, OpenPose framework by Carnegie Mellon University of Pittsburgh, Pennsylvania, United States of America, etc.

In some embodiments, activity 450 can include training the face model to determine chin landmarks for a human face based on a first training image dataset that includes face poses shown in selected images as training input data and respective chin landmarks for each of the face poses as training output data. The first training image dataset can be retrieved from a database (e.g., memory device/database 3123 (FIG. 3A)). In many embodiments, activity 450 can be performed iteratively with the first training image dataset updated automatically or manually. In certain embodiments, the face model can be pre-trained, and activity 450 can be performed only once or skipped.

In some embodiments, activity 450 can include receiving a configuration set from a database. For example, the database for storing configuration sets can include memory storage unit 208 (FIG. 2), memory device/database 3123 (FIG. 3A) and/or remote database 320 (FIG. 3A). An exemplary configuration set can include one or more formulas and/or parameters for determining one or more face poses. It is advantageous to use different configuration sets to adapt to different applications of method 400. For example, the configuration set used for determining face poses can be selected in order to adjust the standard of face poses based on the settings by the user and/or the settings by a system administrator.

In some embodiments, the configuration set can include one or more geometric formulas configured to define the region(s) of interest for various face poses. The geometric formulas can be associated with chin landmarks and one or more reference points also defined in the configuration set (e.g., the midpoint between the right shoulder joint and the chin). In several embodiments, the one or more geometric formulas can include (a) one or more line segment formulas associated with the chin landmark and the one or more reference points; and/or (b) one or more curve segment formulas associated with the chin landmark and the one or more reference points. In some embodiments, the configuration set can include an array of rectangles detailing the orientation (e.g., pitch, yaw, roll) of faces.

In some embodiments, activity 450 can include verifying, via the face model, as trained, that a face of the user in the one or more frames of the image corresponds to a predetermined chin pose in the configuration set. In certain embodiments, activity 450 can verify the user face pose when the matching between the user face pose and the predetermined face pose is above a predetermined threshold. The pose comparison can be performed by any suitable pose detection APIs (e.g., pose detection APIs under the Vision framework, ML Kit framework, OpenPose framework, etc.), and the threshold can be any suitable percentage (e.g., 75%, 80%, etc.). In some embodiments, the face model can verify that the face of the user is aligned based on generating an array of rectangles that identify respective locations and orientations of the face of the user and the chin landmark of the user. In some embodiments, in response to verifying the face of the user is properly aligned in the one or more frames of the image, activity 450 can include transmitting a signal to display a face message on the screen of the electronic device indicating to the user that the face of the user is in a proper position.

In many embodiments, method 400 can include activity 460 of processing the one or more frames of the image from the electronic device based on the frame processing operation to determine hair of the user is properly positioned in the one or more frames of the image. In some embodiments, activity 460 can include determining the hair of the user is properly positioned in the one or more frames of the image by determining a right shoulder landmark and a left shoulder landmark on the body of the user based the one or more frames of the image. For example, activity 460 can access the right shoulder landmark and the left shoulder landmark from the body joint landmarks that are output by the body pose model in activity 440. In some embodiments, activity 460 can include drawing a line between the right shoulder landmark and the left shoulder landmark to determine coordinates of all the pixels on that line.

In a number of embodiments, activity 460 can include training a hair model to determine whether an image pixel can be categorized as a hair pixel based on the color of the image pixel. For example, the hair model can be trained based on a second training image dataset comprising pixels that are known to be hair pixels and non-hair pixels. The second training image dataset can be retrieved from a database (e.g., memory device/database 3123 (FIG. 3A)). The hair model can include any suitable machine learning algorithms (e.g., a convolutional neural network (CNN) model, a ResNet model, a Decision Tree (DT) model, a Support Vector Machine (SVM) model, a K-Nearest Neighbor (KNN) classifier, a combined CNN/Transformer model, a Bilateral Network with Guided Aggregation for Real-Time Semantic Segmentation (BiSeNet V2) model, etc.). The hair model further can be implemented by system 300 (FIG. 3A), system 310 (FIG. 3A), user device 3110 (FIG. 3A), back-end system 3120 (FIG. 3A), and/or guidance application 3400 (FIG. 3A-3B)). In some embodiments, training the hair model can be performed iteratively with the second training image dataset updated automatically or manually. In certain embodiments, the hair model can be pre-trained.

Turning briefly to FIG. 6, an exemplary hair mask 600 is illustrated that includes a portion 602 that identifies pixels that contain human hair. As disclosed herein, the hair model can be trained to generate a hair mask 600 in the detection engine 3420 prior to proceeding to the validation engine 3430.

Returning to FIG. 4, in some embodiments, activity 460 can include determining, via the hair model, as trained, a hair mask layer with a hair mask for the one or more frames of the image. In some embodiments, the hair mask is determined based on a respective color of pixels of the image that are positioned between the right shoulder landmark and the left shoulder landmark. In some embodiments, activity 460 can determine the hair mask layer in real-time. For example, the hair model can include for a user device (e.g., user device 3110 (FIG. 3A)) to use guidance application 3400 (FIG. 3A-3B)) to interface, in real-time, with the hair model to have pixels of the image for the user categorized as hair pixels or not by the hair model. After categorizing each pixel into hair or non-hair, activity 460 can determine the respective value for each pixel of the image in the hair mask layer.

In a number of embodiments, activity 460 can include determining a respective binary value for each pixel of the one or more frames of the image based on the respective color for each pixel of the image between the right shoulder landmark and the left shoulder landmark. For example, the hair mask layer, as determined, can include a respective binary value for each pixel for the image, and the pixels to be categorized as hair pixels can correspond to a binary value of 1 in the hair mask, and the pixels to be categorized as non-hair pixels can correspond to a binary value of 0 in the hair mask, or vice versa.

In some embodiments, activity 460 can include using the hair mask on the coordinates of the pixels between the right shoulder landmark and the left shoulder landmark to determine how many of the pixels are hair pixels. For example, activity 460 can calculate what percentage of the pixels between the right shoulder landmark and the left shoulder landmark are hair pixels and determine if the percentage satisfies a threshold. For example, if the hair pixels are above 50% a message can be displayed to the user to move their hair away from their shoulders. However, any percentage can be used such as 25%, 40%, 60%, etc. In some embodiments, activity 460 can include in response to verifying the hair of the user is properly positioned in the one or more frames of the image, transmitting a signal to display a hair message on the screen of the electronic device indicating to the user that the hair of the user is in a proper position.

Turning briefly to FIG. 7, an exemplary hair model analysis 700 is illustrated, according to an embodiment. In the illustrated hair model analysis 700, the hair model has determined the coordinates of the pixels 702 between the right shoulder landmark and the left shoulder landmark. In the illustrated embodiment, the coordinates of the pixels 702 have a majority of the pixels as hair pixels. As such, a message can be displayed for the user to move their hair behind their shoulders.

Returning to FIG. 4, in many embodiments, method 400 can include activity 470 of processing the one or more frames of the image from the electronic device based on the frame processing operation to determine enough skin of the user is visible in the one or more frames of the image. For example, if the user is wearing long pants, if the user is wearing a shirt with long sleeves or short sleeves, and/or if the user has long hair covering the user's shoulders, then activity 470 will detect that there is not enough skin of the user visible in the one or more frames of the image. In some embodiments, determining if enough skin of the user is visible in the one or more frames of the image can include determining, via a skin segmentation model, a respective binary value for each pixel of the one or more frames of the image based on a respective color for each pixel in the one or more frames of the image. In a number of embodiments, activity 470 can include training the skin segmentation model to determine whether an image pixel can be categorized as a skin pixel based on the color of the image pixel. For example, the skin segmentation model can be trained based on a third training image dataset comprising pixels that are known to be human-skin pixels and non-human-skin pixels. The third training image dataset can be retrieved from a database (e.g., memory device/database 3123 (FIG. 3A)). The skin segmentation model can include any suitable machine learning algorithms (e.g., a convolutional neural network (CNN) model, a ResNet model, a Decision Tree (DT) model, a Support Vector Machine (SVM) model, a K-Nearest Neighbor (KNN) classifier, a combined CNN/Transformer model, a Bilateral Network with Guided Aggregation for Real-Time Semantic Segmentation (BiSeNet V2) model, etc.). The skin segmentation model further can be implemented by system 300 (FIG. 3A), system 310 (FIG. 3A), user device 3110 (FIG. 3A), back-end system 3120 (FIG. 3A), and/or guidance application 3400 (FIG. 3A-3B)). In many embodiments, training the skin segmentation model can be performed iteratively with the third training image dataset updated automatically or manually. In certain embodiments, the skin segmentation model can be pretrained.

In many embodiments, method 400 further can include determining, via the skin segmentation model, as trained in block 450, a skin mask layer with a skin mask for the one or more frames of the image. In some embodiments, activity 470 can determine the skin mask layer in real-time. For example, the skin segmentation model can include for a user device (e.g., user device 3110 (FIG. 3A)) to use guidance application 3400 (FIG. 3A-3B)) to interface, in real-time, with the skin segmentation model to have pixels of the image for the user body categorized as human-skin pixels or not by the skin segmentation model. After categorizing each pixel into human-skin or non-human-skin, activity 470 can determine the respective value for each pixel of the image in the skin mask layer.

In a number of embodiments, the skin mask layer can include a respective binary value for each pixel for the image, and the pixels to be categorized as human-skin pixels can correspond to a binary value of 1 in the skin mask, and the pixels to be categorized as human-skin pixels can correspond to a binary value of 0 in the skin mask, or vice versa.

In some embodiments, activity 470 can include identifying body joint landmarks from the body pose model and draw lines on each limb (e.g., right leg, left leg, right arm, left arm, etc.) to determine coordinates of pixels along the lines for each limb. In some embodiments, activity 470 can include using the skin mask to determine how many of the pixels on the coordinates of the limbs are skin pixels. For example, activity 470 can calculate what percentage of the pixels between landmarks (e.g., between right wrist and right elbow, between right elbow and right shoulder, etc.) are skin pixels and determine if the percentage satisfies a threshold. For example, if the skin pixels are above 50% a message can be displayed to the user to move their clothing away from their shoulders (e.g., roll up their sleeves). However, any percentage can be used such as 25%, 40%, 60%, etc. In some embodiments, activity 470 can include, in response to verifying that enough skin is showing in the one or more frames of the image, transmitting a signal to display a skin message on the screen of the electronic device indicating to the user that enough skin is showing.

Figure 8:
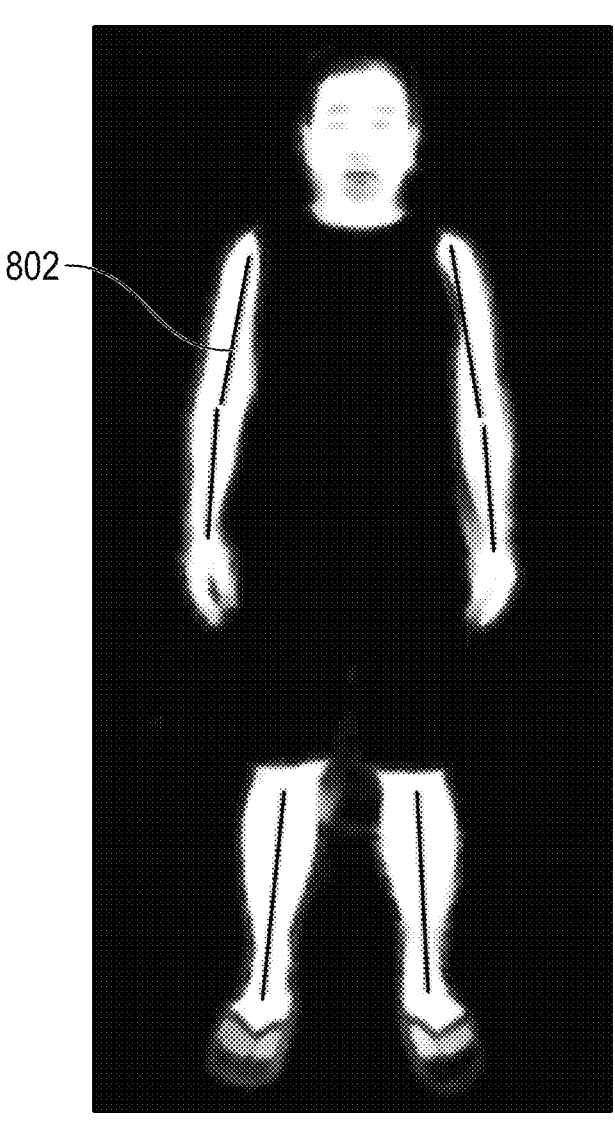
FIG. 8 illustrates an exemplary skin segmentation model analysis, according to an embodiment.

Turning briefly to FIG. 8, an exemplary skin segmentation model analysis 800 is illustrated, according to an embodiment. In the illustrated skin segmentation model analysis 800, the skin segmentation model has determined the coordinates of the pixels 802 between the body pose landmarks (e.g., between right wrist and right elbow, between right elbow and right shoulder, etc.). In the illustrated embodiment, the coordinates of the pixels 802 have a majority of the pixels as skin pixels. As such, the method 400 can proceed.

Returning to FIG. 4, in many embodiments, method 400 can include activity 480 of capturing an image of the user with the pre-selected joint landmarks to enable items to be overlaid on the image of the user in response to the one or more frames of the image being validated. In a number of embodiments, activity 480 can include capturing, via a camera (e.g., camera 3111 (FIG. 3A)), an image featuring a body of a user (e.g., user 311 (FIG. 3A)) for upload. In some embodiments, the image can include the joint landmarks from the body pose model to enable items to be overlaid on the image. In embodiments where the image taken by the user is to be uploaded to an online retailer website (e.g., e-commerce website 3310 (FIG. 3A)) for the user to virtually try an apparel, the configuration set in activity 440 can include a predetermined pose (e.g., a standard anatomical position, a forward-facing standing position with arms placed at the sides, etc.) for the apparel. In certain embodiments, activity 480 can include pre-processing the image, such as automatic white balance, color correction, noise removal, etc. In embodiments where the image taken by the user is to be uploaded to an online retailer website, the user can utilize the image to shop for clothing and see an altered image that includes potential clothing options overlaid on the image of the user based on the positioning of the body pose landmarks.

In many embodiments, activity 480 is performed only after the one or more frames of the image are validated, as explained above. As also explained above, in the same or different embodiments, the validation can be for electronic device alignment, environmental lighting, body joint alignment, face alignment, hair positioning, and/or skin exposure. Furthermore, in various embodiments, the validation can occur after each of activities 420, 430, 440, 440, 450, 460, and 470 and before the next one of such activities (e.g., electronic device alignment can be validated after activity 420 (or as part of activity 420) and before activity 430; environmental lighting can be validated after activity 430 (or as part of activity 430) and before activity 440; body joint alignment can be validate after activity 440 (or as part of activity 440) and before activity 450; face alignment can be validated after activity 450 (or as part of activity 450) and before activity 460; hair positioning can be validated after activity 460 (or as part of activity 460) and before activity 470, and/or skin exposure can be validated after activity 470) (or as part of activity 470) and before activity 480).

FIGS. 10A-10G illustrate an exemplary user interface 1000 that includes a dialogue portion 1002 to display messages to the user. In the illustrated embodiment of FIG. 10A, the user interface 1000 includes an alignment visual 1004 to guide the user through activity 420 of method 400 (FIG. 4). The illustrated embodiment of FIG. 10A displays a message in the dialogue portion 1002 to request the user position their device at waist height.

Figure 10B:
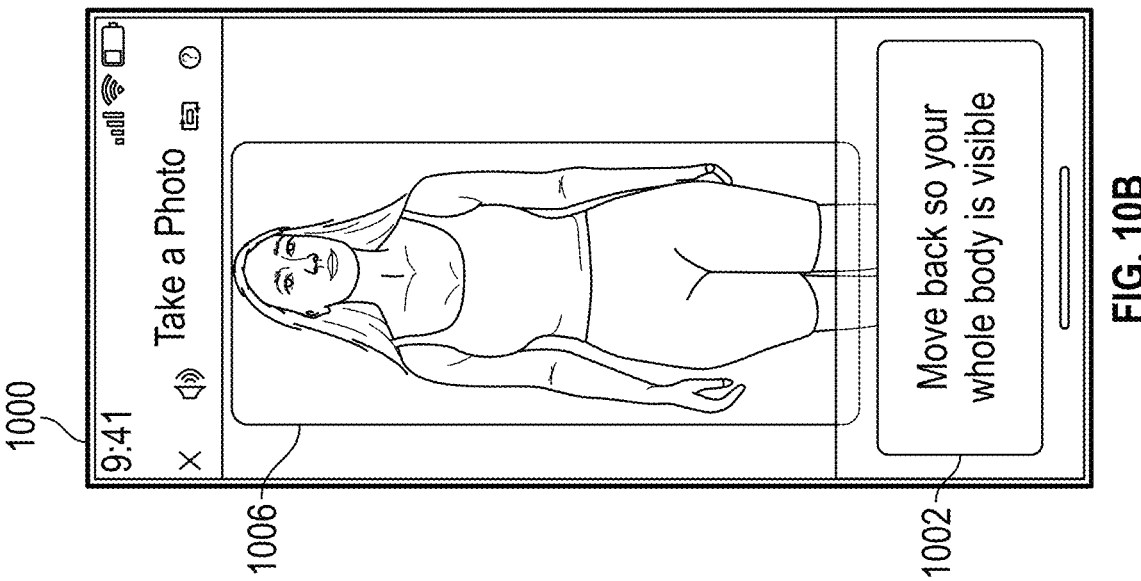
FIG. 10B illustrates an exemplary user interface, according to an embodiment.
Figure 10A:
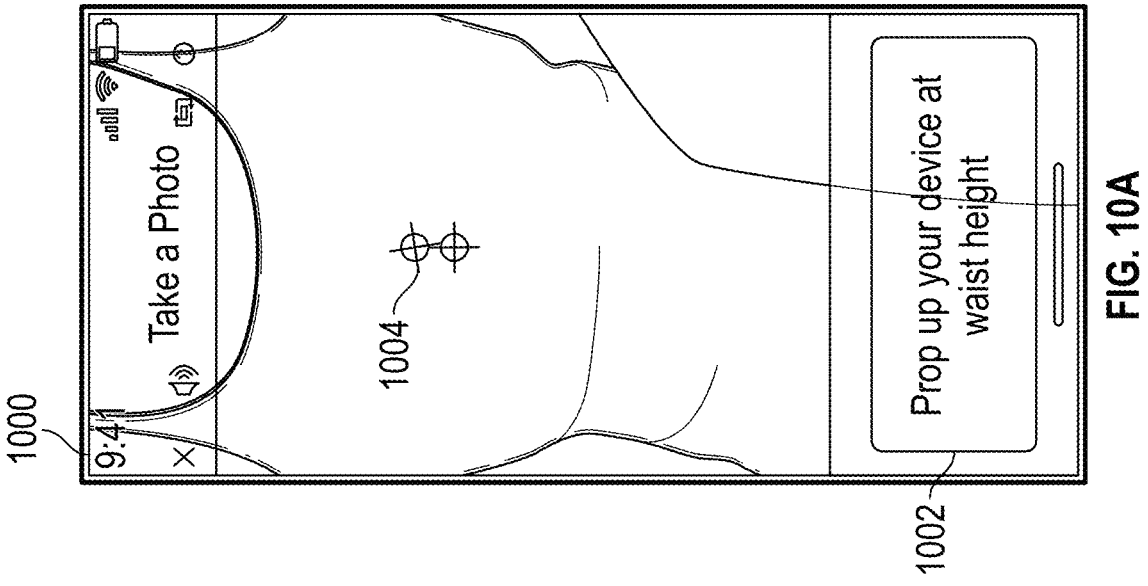
FIG. 10A illustrates an exemplary user interface, according to an embodiment.

In the illustrated embodiment of FIG. 10B, the user interface 1000 includes a human body rectangle 1006 that can be determined in activities 440-450 of method 400 (FIG. 4). The illustrated embodiment of FIG. 10B displays a message in the dialogue portion 1002 to request the user to move backwards to enable their whole body to be visible in the frame of the camera.

Figure 10D:
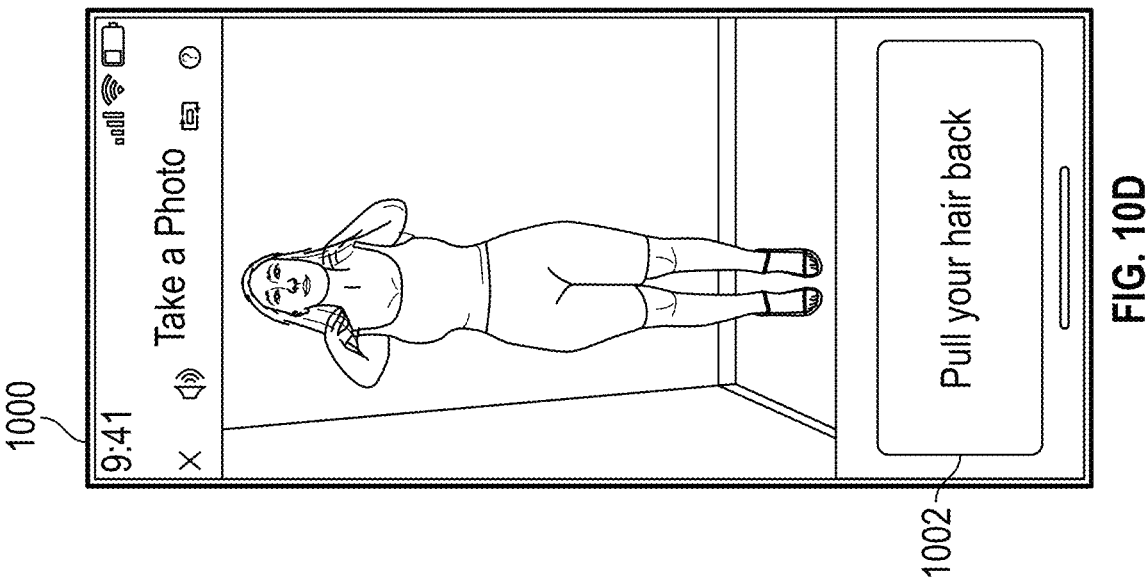
FIG. 10D illustrates an exemplary user interface, according to an embodiment.
Figure 10C:
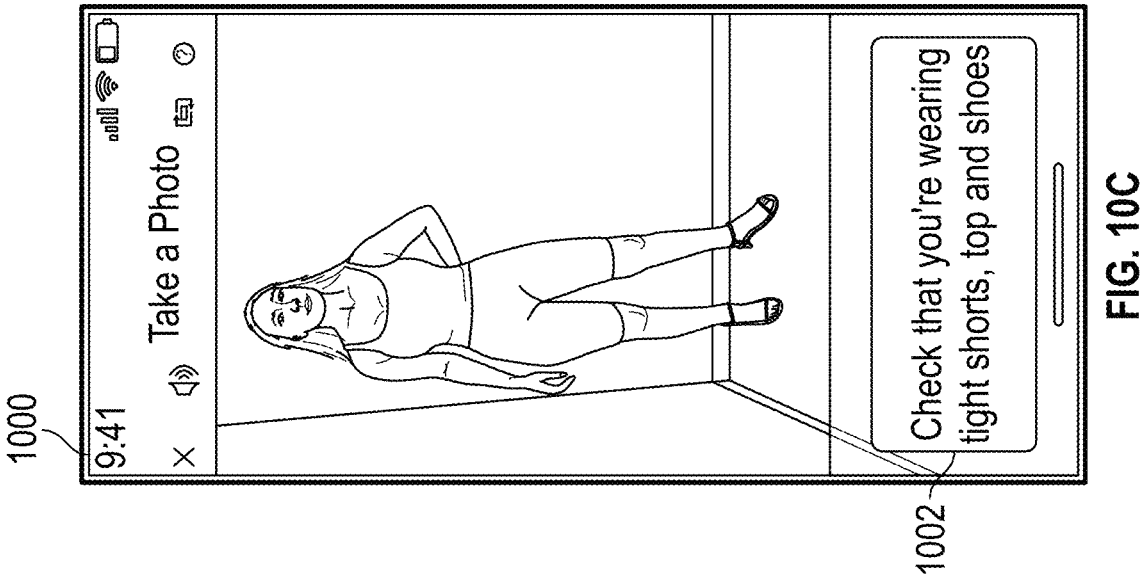
FIG. 10C illustrates an exemplary user interface, according to an embodiment.

The illustrated embodiment of FIG. 10C displays a message in the dialogue portion 1002 to request the user to make sure they are in the proper attire.

The illustrated embodiment of FIG. 10D displays a message in the dialogue portion 1002 to request the move their hair behind their shoulders.

Figure 10F:
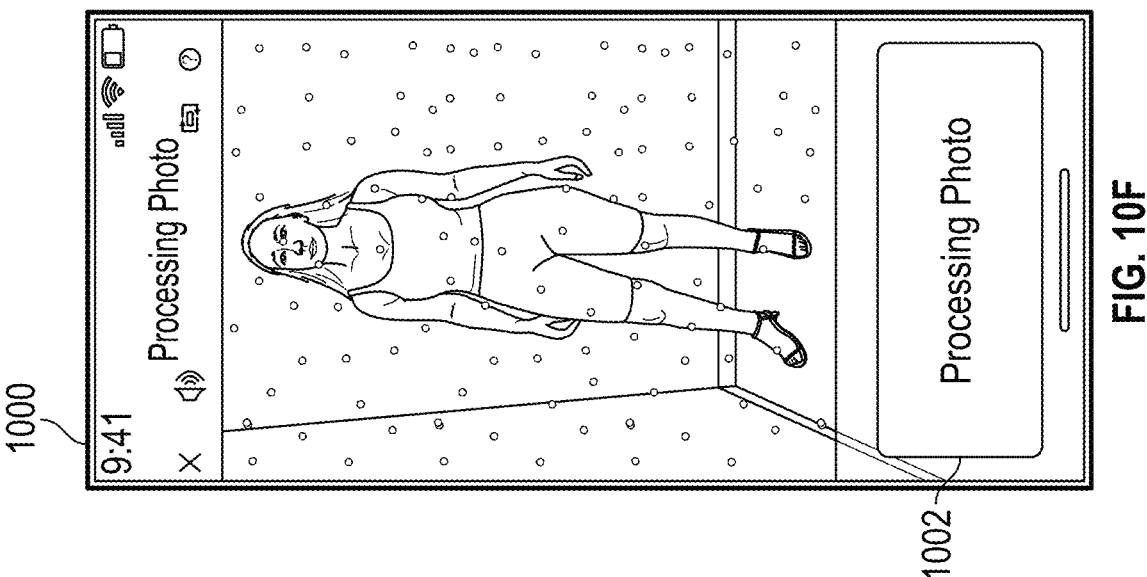
FIG. 10F illustrates an exemplary user interface, according to an embodiment.
Figure 10E:
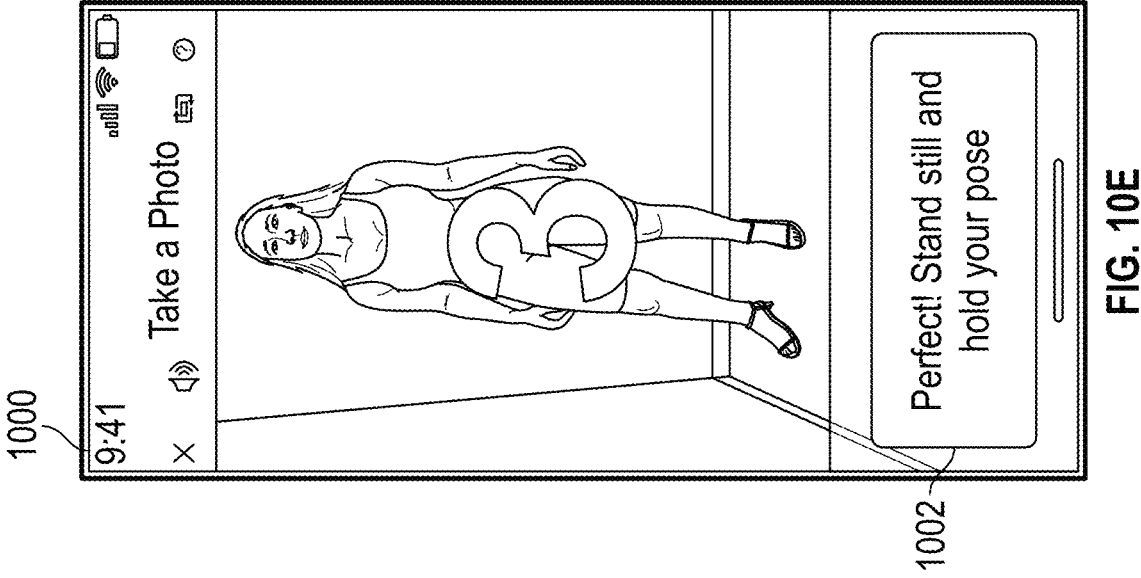
FIG. 10E illustrates an exemplary user interface, according to an embodiment.

The illustrated embodiment of FIG. 10E displays a message in the dialogue portion 1002 to inform the user that the guidance application 3400 has completed the detection and validation processes and the image of the user is going to be captured.

The illustrated embodiment of FIG. 10F displays a message in the dialogue portion 1002 to inform the user that the guidance application 3400 is processing the captured image.

Figure 10G:
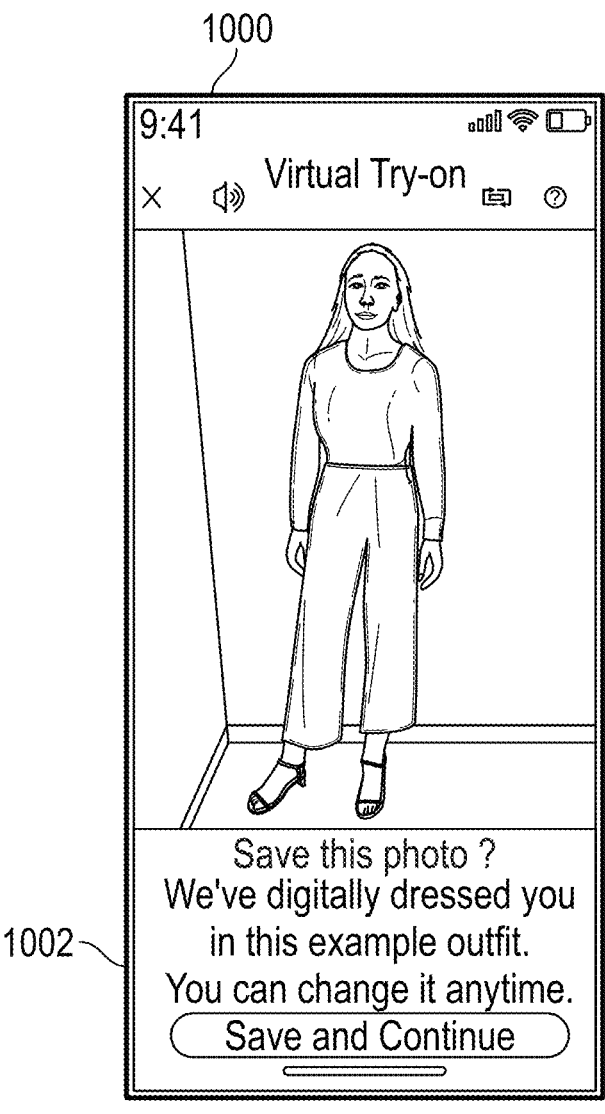
FIG. 10G illustrates an exemplary user interface, according to an embodiment.

The illustrated embodiment of FIG. 10G displays an exemplary user interface 1000 that includes virtual clothing overlaid on the captured image of the user to enable the user to see what clothing will look like on them.

Various embodiments can include a system for guiding a user to capture an image of the user. The system can include one or more processors and one or more non-transitory computer-readable media storing computing instructions that, when executed on the one or more processors, cause the one or more processors to perform various acts. In many embodiments, the acts can include capturing, via a camera, an image for upload to a memory device or database (e.g., memory device/database 3123 (FIG. 3), remote database 320 (FIG. 3), etc.). The image can feature a user body of the user.

Various embodiments can include a system comprising one or more processors and one or more non-transitory computer-readable media storing computing instructions that, when executed on the one or more processors, cause the one or more processors to perform: determining a frame processing operation for one or more frames of an image from an electronic device, the one or more frames of the image corresponding to a body of a user; processing the one or more frames of the image from the electronic device based on the frame processing operation to determine if the electronic device is in alignment; processing the one or more frames of the image from the electronic device based on the frame processing operation to determine if the electronic device is in an environment that satisfies a light threshold; processing the one or more frames of the image from the electronic device based on the frame processing operation to determine pre-selected joint points for the body of the user in the one or more frames of the image based on pre-selected joint landmarks defined in a configuration set; processing the one or more frames of the image from the electronic device based on the frame processing operation to determine a face alignment of the user in the one or more frames of the image; processing the one or more frames of the image from the electronic device based on the frame processing operation to determine hair of the user is properly positioned in the one or more frames of the image; processing the one or more frames of the image from the electronic device based on the frame processing operation to determine enough skin of the user is visible in the one or more frames of the image; and in response to the one or more frames of the image being validated, capturing an image of the user with the pre-selected joint landmarks to enable items to be overlaid on the image of the user.

Various embodiments can include a method comprising: determining a frame processing operation for one or more frames of an image from an electronic device, the one or more frames of the image corresponding to a body of a user; processing the one or more frames of the image from the electronic device based on the frame processing operation to determine if the electronic device is in alignment; processing the one or more frames of the image from the electronic device based on the frame processing operation to determine if the electronic device is in an environment that satisfies a light threshold; processing the one or more frames of the image from the electronic device based on the frame processing operation to determine pre-selected joint points for the body of the user in the one or more frames of the image based on pre-selected joint landmarks defined in a configuration set; processing the one or more frames of the image from the electronic device based on the frame processing operation to determine a face alignment of the user in the one or more frames of the image; processing the one or more frames of the image from the electronic device based on the frame processing operation to determine hair of the user is properly positioned in the one or more frames of the image; processing the one or more frames of the image from the electronic device based on the frame processing operation to determine enough skin of the user is visible in the one or more frames of the image; and in response to the one or more frames of the image being validated, capturing an image of the user with the pre-selected joint landmarks to enable items to be overlaid on the image of the user.

In many embodiments, the techniques described herein can provide a practical application and several technological improvements. The techniques described herein can provide technological improvements to user interface guidance applications. Further, the techniques disclosed here can provide simplified processing necessary for various online applications, such as virtual apparel fitting for online retail websites, image sharing on social media platforms, image backup on cloud storages, etc. These techniques described herein can provide a significant improvement over conventional approaches that use rigid steps that do not account for the user actions in real-time.

Embodiments disclosed herein can improve performance of a computing system. For example, embodiments disclosed herein utilize the frame processing speed, overall memory consumption, and energy consumption of the computing device to execute functions in phases to conserve resources. Utilizing the phase approach can ensure the computing device is not overloaded. For example, monitoring the device alignment ensures the subsequent processing benefits from the proper orientation of the image, and if the device alignment is invalid (e.g., the user puts their electronic device down), subsequent processing ceases thereby conserving resources and mitigating the computing device from overheating. Additionally, processing activities can be grouped and run in parallel to conserve computing resources. Embodiments disclosed herein can utilize a reference to the current frame buffer in an observation map at any operation execution to allow setting up conditions for cancelling subsequence operations if any dependent operations fail. Embodiments disclosed herein mitigate noise in camera frames by throttling feedback to the user. For example, if validation result of each frame are displayed directly to the user, it will create a confusion because the messages will be inconsistent and changing very quickly. Embodiments disclosed herein can average the results and display status changes to the user gradually. Embodiments disclosed herein can calculate coordinates of the pixels between two landmarks and iterate only those pixels in order to estimate the percentage of exposure, thereby reducing processing times and conserving computing resources.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although user interface guidance applications have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10G may be modified, and that the foregoing discussion of certain of these embodiments does not necessarily represent a complete description of all possible embodiments. Different functions, parameters, and/or machine learning algorithms may be used and various training image datasets can be used for training the machine learning algorithms described above.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when run on the one or more processors, cause the one or more processors to perform:
determining a frame processing operation for one or more frames of an image from an electronic device, the one or more frames of the image corresponding to a body of a user, wherein determining the frame processing operation comprises:
determining if the system is in a live image detection stage or a still image detection stage; and
determining a processing speed for the one or more images;
processing the one or more frames of the image from the electronic device based on the frame processing operation to determine if the electronic device is in alignment;
processing the one or more frames of the image from the electronic device based on the frame processing operation to determine if the electronic device is in an environment that satisfies a light threshold;
processing the one or more frames of the image from the electronic device based on the frame processing operation to determine pre-selected joint points for the body of the user in the one or more frames of the image based on pre-selected joint landmarks defined in a configuration set;
processing the one or more frames of the image from the electronic device based on the frame processing operation to determine a face alignment of the user in the one or more frames of the image;
processing the one or more frames of the image from the electronic device based on the frame processing operation to determine hair of the user is properly positioned in the one or more frames of the image;
processing the one or more frames of the image from the electronic device based on the frame processing operation to determine enough skin of the user is visible in the one or more frames of the image by categorizing a number of pixels in the one or more frames of the image as skin pixels and determining that the number of skin pixels exceeds a threshold number; and
in response to the one or more frames of the image being validated, capturing an image of the user with the pre-selected joint landmarks to enable items to be overlaid on the image of the user.

2. The system in claim 1, wherein processing the one or more frames of the image from the electronic device to determine if the electronic device is in alignment further comprises:
accessing an accelerometer of the electronic device to determine a first measurement;
transmitting a first signal to output a first identifier on a screen of the electronic device based on the first measurement, the first identifier output in a stationary position on the screen of the electronic device;
transmitting a second signal to output a second identifier on the screen of the electronic device, the second identifier to move on the screen based on movement of the electronic device by the user;

in response to the user moving the electronic device, accessing the accelerometer of the electronic device to determine a second measurement for the second identifier; and determining the electronic device is in alignment when the first measurement and the second measurement are within a threshold distance of each other corresponding to the first identifier matching the second identifier on the screen of the electronic device; and transmitting a third signal to display an alignment message on the screen of the electronic device indicating to the user that the electronic device is aligned.

3. The system of claim 1, wherein processing the one or more frames of the image from the electronic device based on the frame processing operation to determine if the electronic device is in an environment that satisfies the light threshold further comprises:

analyzing a brightness measurement of each of the one or more frames of the image;

analyzing isoSpeedRating EXIF information of each of the one or more frames of the image; and in response to the brightness measurement and isoSpeedRating EXIF information satisfying the light threshold, transmitting a signal to display a light message on a screen of the electronic device for the user indicating that the electronic device is in an environment that satisfies the light threshold.

4. The system of claim 1, wherein processing the one or more frames of the image from the electronic device based on the frame processing operation to determine the pre-selected joint points for the body of the user in the one or more frames of the image based on the pre-selected joint landmarks defined in the configuration set further comprises:

training a body pose model to determine body joint landmarks for a human body based on body poses in a first training image dataset and respective landmarks for each of the body poses; and verifying, via the body pose model, as trained, that the body of the user in the one or more frames of the image corresponds to a predetermined pose in the configuration set.

5. The system of claim 1, wherein processing the one or more frames of the image from the electronic device based on the frame processing operation to determine the face alignment of the user in the one or more frames of the image further comprises:

training a face model to determine one or more chin landmarks for a human face based on face poses in a first training image dataset and respective landmarks for each of the face poses; and verifying, via the face model, as trained, that a face of the user in the one or more frames of the image corresponds to a predetermined chin pose in the configuration set.

6. The system of claim 5, wherein the face model verifies that the face of the user is aligned based on generating an array of rectangles that identify respective locations and orientations of the face of the user and a chin landmark of the user; and in response to verifying the face of the user is properly aligned in the one or more frames of the image, transmitting a signal to display a face message on a screen of the electronic device indicating to the user that the face of the user is in a proper position.

7. The system of claim 1, wherein processing the one or more frames of the image from the electronic device based on the frame processing operation to determine the hair of the user is properly positioned in the one or more frames of the image further comprises:

determining a right shoulder landmark and a left shoulder landmark on the body of the user based the one or more frames of the image;

determining a hair mask layer with a hair mask for the one or more frames of the image, wherein the hair mask is determined based on a respective color of pixels of the image that are positioned between the right shoulder landmark and the left shoulder landmark;

determining a respective binary value for each pixel of the one or more frames of the image based on the respective color for each pixel of the image between the right shoulder landmark and the left shoulder landmark;

determining, using a hair model trained based on hair pixels and non-hair pixels of training images, whether an image pixel is categorized as a hair pixel; and in response to verifying the hair of the user is properly positioned in the one or more frames of the image, transmitting a signal to display a hair message on a screen of the electronic device indicating to the user that the hair of the user is in a proper position.

8. The system of claim 1, wherein processing the one or more frames of the image from the electronic device based on the frame processing operation to determine enough skin of the user is visible in the one or more frames of the image further comprises:

determining, via a skin segmentation model, a respective binary value for each pixel of the one or more frames of the image based on a respective color for each pixel in the one or more frames of the image; and determining a skin mask layer with a skin mask for the one or more frames of the image based on a respective color for each pixel in the one or more frames of the image.

9. The system of claim 8, further comprising training the skin segmentation model to determine whether a pixel in the one or more frames of the image is categorized as a skin pixel based on human-skin pixels and non-human-skin pixels of training images in a training image dataset.

10. The system of claim 1, wherein the one or more non-transitory computer-readable media storing computing instructions further cause the one or more processors to perform:

in response to at least one of: determining that the electronic device is in alignment or determining that the electronic device is in an environment that satisfies the light threshold, processing the one or more frames of the image from the electronic device based on the frame processing operation to determine the pre-selected joint points for the body of the user in the one or more frames of the image based on pre-selected joint landmarks defined in a configuration set, and processing the one or more frames of the image from the electronic device based on the frame processing operation to determine the face alignment of the user in the one or more frames of the image;

based on determining at least one of: the pre-selected joint points or the face alignment, processing the one or more frames of the image from the electronic device based on the frame processing operation to determine hair of the user is properly positioned in the one or more frames of the image, and processing the one or more frames of the image from the electronic device based on the frame processing operation to determine enough skin of the user is visible in the one or more frames of the image; and validating the one or more frames of the image based on the at least one of: the determination that the hair of the user is properly positioned in the one or more frames or the determination that enough skin of the user is visible in the one or more frames of the image.

11. A method being implemented via execution of computing instructions configured to run at one or more processors and stored at one or more non-transitory computer-readable media, the method comprising:

determining a frame processing operation for one or more frames of an image from an electronic device, the one or more frames of the image corresponding to a body of a user, wherein determining the frame processing operation comprises:

determining if the frame processing operation is in a live image detection stage or a still image detection stage; and determining a processing speed for the one or more images;

processing the one or more frames of the image from the electronic device based on the frame processing operation to determine if the electronic device is in alignment;

processing the one or more frames of the image from the electronic device based on the frame processing operation to determine if the electronic device is in an environment that satisfies a light threshold;

processing the one or more frames of the image from the electronic device based on the frame processing operation to determine pre-selected joint points for the body of the user in the one or more frames of the image based on pre-selected joint landmarks defined in a configuration set;

processing the one or more frames of the image from the electronic device based on the frame processing operation to determine a face alignment of the user in the one or more frames of the image;

processing the one or more frames of the image from the electronic device based on the frame processing operation to determine hair of the user is properly positioned in the one or more frames of the image;

processing the one or more frames of the image from the electronic device based on the frame processing operation to determine enough skin of the user is visible in the one or more frames of the image by categorizing a number of pixels in the one or more frames of the image as skin pixels and determining that the number of skin pixels exceeds a threshold number; and in response to the one or more frames of the image being validated, capturing an image of the user with the pre-selected joint landmarks to enable items to be overlaid on the image of the user.

12. The method in claim 11, wherein processing the one or more frames of the image from the electronic device to determine if the electronic device is in alignment further comprises:

accessing an accelerometer of the electronic device to determine a first measurement;

transmitting a first signal to output a first identifier on a screen of the electronic device based on the first measurement, the first identifier output in a stationary position on the screen of the electronic device;

transmitting a second signal to output a second identifier on the screen of the electronic device, the second identifier to move on the screen based on movement of the electronic device by the user;

in response to the user moving the electronic device, accessing the accelerometer of the electronic device to determine a second measurement for the second identifier; and determining the electronic device is in alignment when the first measurement and the second measurement are within a threshold distance of each other corresponding to the first identifier matching the second identifier on the screen of the electronic device; and transmitting a third signal to display an alignment message on the screen of the electronic device indicating to the user that the electronic device is aligned.

13. The method of claim 11, wherein processing the one or more frames of the image from the electronic device based on the frame processing operation to determine if the electronic device is in an environment that satisfies the light threshold further comprises:

analyzing a brightness measurement of each of the one or more frames of the image;

analyzing isoSpeedRating EXIF information of each of the one or more frames of the image; and in response to the brightness measurement and isoSpeedRating EXIF information satisfying the light threshold, transmitting a signal to display a light message on a screen of the electronic device for the user indicating that the electronic device is in an environment that satisfies the light threshold.

14. The method of claim 11, wherein processing the one or more frames of the image from the electronic device based on the frame processing operation to determine the pre-selected joint points for the body of the user in the one or more frames of the image based on the pre-selected joint landmarks defined in the configuration set further comprises:

training a body pose model to determine body joint landmarks for a human body based on body poses in a first training image dataset and respective landmarks for each of the body poses; and verifying, via the body pose model, as trained, that the body of the user in the one or more frames of the image corresponds to a predetermined pose in the configuration set.

15. The method of claim 11, wherein processing the one or more frames of the image from the electronic device based on the frame processing operation to determine the face alignment of the user in the one or more frames of the image further comprises:

training a face model to determine one or more chin landmarks for a human face based on face poses in a first training image dataset and respective landmarks for each of the face poses; and verifying, via the face model, as trained, that a face of the user in the one or more frames of the image corresponds to a predetermined chin pose in the configuration set.

16. The method of claim 15, wherein the face model verifies that the face of the user is aligned based on generating an array of rectangles that identify respective locations and orientations of the face of the user and a chin landmark of the user; and in response to verifying the face of the user is properly aligned in the one or more frames of the image, transmitting a signal to display a face message on a screen of the electronic device indicating to the user that the face of the user is in a proper position.

17. The method of claim 11, wherein processing the one or more frames of the image from the electronic device based on the frame processing operation to determine the hair of the user is properly positioned in the one or more frames of the image further comprises:

determining a right shoulder landmark and a left shoulder landmark on the body of the user based the one or more frames of the image;

determining a hair mask layer with a hair mask for the one or more frames of the image, wherein the hair mask is determined based on a respective color of pixels of the image that are positioned between the right shoulder landmark and the left shoulder landmark;

determining a respective binary value for each pixel of the one or more frames of the image based on the respective color for each pixel of the image between the right shoulder landmark and the left shoulder landmark;

determining, using a hair model trained based on hair pixels and non-hair pixels of training images, whether an image pixel is categorized as a hair pixel; and in response to verifying the hair of the user is properly positioned in the one or more frames of the image, transmitting a signal to display a hair message on the screen of the electronic device indicating to the user that the hair of the user is in a proper position.

18. The method of claim 11, wherein processing the one or more frames of the image from the electronic device based on the frame processing operation to determine enough skin of the user is visible in the one or more frames of the image further comprises:

determining, via a skin segmentation model, a respective binary value for each pixel of the one or more frames of the image based on a respective color for each pixel in the one or more frames of the image; and determining a skin mask layer with a skin mask for the one or more frames of the image based on a respective color for each pixel in the one or more frames of the image.

19. The method of claim 18, further comprising training the skin segmentation model to determine whether a pixel in the one or more frames of the image is categorized as a skin pixel based on human-skin pixels and non-human-skin pixels of training images in a training image dataset.

* * * * *